United States Patent
Kwon et al.

(10) Patent No.: US 9,621,238 B2
(45) Date of Patent: Apr. 11, 2017

(54) APPARATUS AND METHOD FOR SOUNDING WIRELESS CHANNEL

(71) Applicant: NEWRACOM, Inc., Irvine, CA (US)

(72) Inventors: Young Hoon Kwon, Laguna Niguel, CA (US); Sungho Moon, San Jose, CA (US); Daewon Lee, Irvine, CA (US)

(73) Assignee: NEWRACOM, Inc., Irvine, CA (US)

( * ) Notice: Subject to any disclaimer, the term of this patent is extended or adjusted under 35 U.S.C. 154(b) by 0 days.

(21) Appl. No.: 15/093,429

(22) Filed: Apr. 7, 2016

(65) Prior Publication Data
US 2016/0301452 A1 Oct. 13, 2016

Related U.S. Application Data

(60) Provisional application No. 62/147,491, filed on Apr. 14, 2015, provisional application No. 62/144,285, filed on Apr. 7, 2015.

(51) Int. Cl.
*H04B 7/02* (2006.01)
*H04B 7/04* (2017.01)
*H04B 7/06* (2006.01)
*H04W 84/12* (2009.01)
*H04W 16/28* (2009.01)

(52) U.S. Cl.
CPC ......... *H04B 7/0421* (2013.01); *H04B 7/0617* (2013.01); *H04W 16/28* (2013.01); *H04W 84/12* (2013.01)

(58) Field of Classification Search
CPC .. H04B 7/0617; H04B 7/0421; H04B 7/0628; H04B 7/0417; H04B 1/0675; H04B 1/0687; H04L 1/0618
See application file for complete search history.

(56) References Cited

U.S. PATENT DOCUMENTS

| | | | | |
|---|---|---|---|---|
| 9,473,341 B2 * | 10/2016 | Zhang | ................ | H04L 5/0007 |
| 2006/0172704 A1 * | 8/2006 | Nishio | ................ | H04L 5/0007 |
| | | | | 455/67.11 |
| 2006/0291544 A1 * | 12/2006 | Fischer | ................ | H04B 7/0617 |
| | | | | 375/219 |
| 2007/0155338 A1 * | 7/2007 | Hong | ................ | H04B 7/026 |
| | | | | 455/69 |

(Continued)

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.

(Continued)

*Primary Examiner* — Khanh C Tran
(74) *Attorney, Agent, or Firm* — NDWE LLP

(57) ABSTRACT

A method and system for improving the accuracy of phase and frequency offset during multiple in multiple out (MIMO) channel estimation in a sounding procedure. The improved phase and frequency offset process selects resource allocation unit configuration to ensure a minimum pilot density from the available operation modes. A method for reducing the data in the feedback matrix of the sounding procedure correlates the long training frame (LTF) and number of groups (Ng) between the sounding frame and the feedback to improve efficiency in the amount of feedback that is returned.

17 Claims, 14 Drawing Sheets

(56) References Cited

U.S. PATENT DOCUMENTS

| | | | | |
|---|---|---|---|---|
| 2007/0286310 | A1* | 12/2007 | Fukuoka | H04B 7/02 375/340 |
| 2008/0080635 | A1* | 4/2008 | Hugl | H04L 1/0631 375/267 |
| 2014/0044069 | A1* | 2/2014 | Bao | H04B 7/0417 370/329 |
| 2015/0124900 | A1* | 5/2015 | Shapira | H04B 7/0452 375/267 |
| 2015/0146807 | A1* | 5/2015 | Zhang | H04L 5/0007 375/260 |
| 2015/0334708 | A1* | 11/2015 | Lee | H04W 72/0446 370/329 |
| 2016/0255656 | A1* | 9/2016 | Lou | H04L 1/0026 |

OTHER PUBLICATIONS

IEEE P802.11-REVmc/D4.0: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Jan. 2015, 3730 pages.

IEEE Std 802.11ac-2013: "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.

IEEE Std 802.11n-2009: "Part 11: Wireless LAN Medium Access Control (MAC) and Physical Layer Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.

* cited by examiner

| Field | Description |
|---|---|
| L-STF | Non-HT Short Training field |
| L-LTF | Non-HT Long Training field |
| L-SIG | Non-HT SIGNAL field |
| VHT-SIG-A | VHT Signal A field |
| VHT-STF | VHT Short Training field |
| VHT-LTF | VHT Long Training field |
| VHT-SIG-B | VHT Signal B field |
| Data | The Data field carries the PSDU(s) |

APPARATUS AND METHOD FOR SOUNDING WIRELESS CHANNEL

CROSS-REFERENCE TO RELATED APPLICATIONS

This application claims the benefit of U.S. Provisional Application No. 62/144,285, filed Apr. 7, 2015, and U.S. Provisional Application No. 62/147,491, filed Apr. 14, 2015, which are hereby incorporated by reference.

FIELD OF INVENTION

The embodiments of the invention are related to the field of wireless local area network (WLAN) operation. More specifically, the embodiments of the invention relate to a method and system for improving the accuracy of phase and frequency offset during multiple in multiple out (MIMO) channel estimation in a sounding procedure. Embodiments also include a method for reducing the data in the feedback matrix of the sounding procedure. Other embodiments are also disclosed.

BACKGROUND

Institute of Electrical and Electronics Engineers (IEEE) 802.11 is a set of physical and media access control (MAC) specifications for implementing wireless local area network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHs spacing dependent on the regulations of the respective country or territory.

IEEE 802.11 defines a data frame exchange process that enables the devices, referred to as stations and access points, to negotiate the timing of the exchange of data between devices over the various shared channels of the 2.4 GHz and 5 GHz bands. As used herein, an access point (AP) is a particular type of station; however, station (STA) is generally used to refer to non-AP stations for clarity. The data frame exchanges could be performed with a single-antenna transmission or a multiple-antenna transmission (also referred to as multiple-input multiple-output or MIMO). That is, each of the stations or access points in the WLAN may include and utilize a single antenna or multiple antennas. In the case of a multiple-antenna or MIMO transmission, multiple spatial streams (SS) are sent within the same frame from one station or access point, which usually is called a beamformer (BFer), to another station or access point, which is usually called a beamformee (BFee), and this type of transmission is called beamforming (BF), or MIMO. BF and MIMO transmissions are usually enhanced by some initial frame exchanges so that the BFer knows about the MIMO channel conditions. This initial exchange of frames before the actual data frame exchange is called a sounding procedure. The frames that might be used in a sounding procedure are the high throughput (HT) and very high throughput (VHT) null data packet (NDP) frames, VHT MIMO Compressed Beamforming Report frame, VHT NDP Announcement (NDPA) frame, and VHT Beamforming Report Poll frame. Each of these frames may have various fields and subfields such as: VHT MIMO Control, VHT Compressed Beamforming Report, MU Exclusive Beamforming Report, Sounding Dialog Token, STA Info, and similar fields that are utilized for exchanging information relevant to beamforming.

SUMMARY

The embodiments include a set of methods that provide an enhanced sounding procedure. More specifically, the embodiments include a method and system for improving the accuracy of phase and frequency offset during multiple in multiple out (MIMO) channel estimation in a sounding procedure. The improved phase and frequency offset process selects resource allocation unit configuration to ensure a minimum pilot density from the available operation modes. The embodiments also include a method for reducing the data in the feedback matrix of the sounding procedure correlates the long training frame (LTF) and number of groups (Ng) between the sounding frame and the feedback to improve efficiency in the amount of feedback that is returned.

The method for improved phase and frequency offset is implemented by a beamformer and may select a mode of operation from a plurality of available modes of operation, where each mode of operation corresponds to a frame format. The selected mode operation for the sounding process is the mode of operation with the minimum pilot tone density amongst the plurality of available modes of operation and their corresponding frame formats. Once the mode of operation is selected, a sounding frame, such as a null data packet (NDP) can be generated with the corresponding frame format and transmitted to a set of beamformees.

In addition, the beamformer may be configured to select a long training field (LTF) format that is compatible with the grouping capabilities of the set of beamformees with regard to compressed beamforming reports. The beamformer selects a compatible LTF compression format and sends a sounding frame with this LTF format to the set of beamformees. The set of beamformees may respond by determining the LTF format of the received sounding frame. The beamformees select a number of groups (Ng) for the compressed beamforming report that matches the LTF format. The corresponding compressed beamforming report is then generated and returned to the beamformer.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
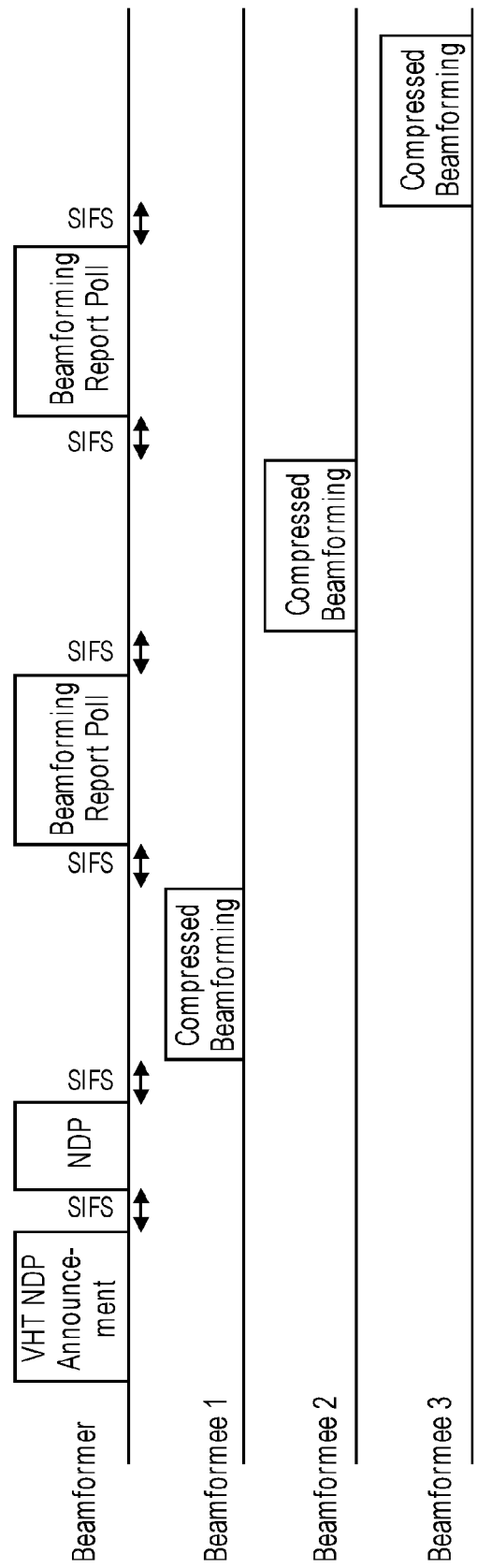
FIG. 1 is a diagram of one embodiment of a beamforming or sounding procedure.

The embodiments provide a method and system for an improved sounding procedure for stations in a wireless communication system such as a wireless local area network (WLAN) implementing an updated version of IEEE 802.11. The improvements to the sounding procedure relate to the accuracy of the sounding procedure in relation to the selection of a mode of operation and correlated resource allocation format utilized in sending a sounding frame such a null data packet (NDP) frame by the beamformer to a beamformee as part of the sounding procedure. With the advent of IEEE 802.11ax's support for multiple resource unit allocation formats, the sounding process cannot assume a given resource allocation unit is utilized. The embodiments provide a process of selecting a mode of operation and corresponding resource allocation unit that ensures the sounding procedure produces accurate phase and frequency offset compensation information for all stations in the WLAN. Further embodiments, provide a process by which the beamformers and beamformees can reduce the amount of feedback that must be returned by a beamformee by identifying in a sounding frame whether feedback data can be compressed and the grouping of such data to be reported. Processes are provided herein for implementation by the beamformer and the beamformee to enable these procedures.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include stations and access points in wireless communications systems such as wireless local area network (WLAN). Stations (STAs) are devices connected to and communicating in a WLAN including client or user devices that connect to the WLAN via access points. Access points (APs) are network devices that may be specialized wireless access points that can communicate with other network devices in the WLAN via the wireless medium or via wired connections. APs may be considered to be a type of STA. However, or sake of clarity, as used herein, STAs refers to non-AP stations.

The embodiments relate to an enhanced sounding procedure. A sounding procedure is a process by which a set of beamformers and beamformees determine the channel conditions of the WLAN to optimize communication between these devices. In some embodiments, each beamformee participating in the sounding procedure may compute a compressed beamforming report that is returned to the beamformer and utilized to generate a steering matrix to configure transmissions between the beamformer and beamformees. In some embodiments, the beamformer (e.g., an AP) may be the primary driver of the sounding procedure. APs or STAs that utilize a steering matrix or compressed beamforming report to transmit to another STA are referred to as 'beamformers' and the other APs or STAs in the WLAN that respond to the sounding procedure and receive the transmissions of the beamformer according to its steering matrix or compressed beamforming report are referred to as the 'beamformees.' In the example where an AP is performing a sounding procedure with a plurality of STAs in a WLAN, the AP may be the beamformer and the communication with the STAs is a downlink (DL)—multi-user (MU)—multiple in multiple out (MIMO) communication. Transmit beamforming and DL-MU-MIMO require knowledge of the channel state to compute the steering matrix that is applied to the transmitted signal to optimize reception at one or more receiver STAs.

In some embodiments, the STA or AP transmitting using the steering matrix is called the beamformer and a STA for which reception is optimized is called a beamformee. An explicit feedback mechanism is used where the beamformee directly measures the channel from the training symbols transmitted by the beamformer and sends back a transformed estimate of the channel state to the beamformer. The beamformer then uses this estimate, perhaps combining estimates from multiple beamformees, to derive the steering matrix. The training symbols can be transmitted in specific fields of a sounding frame. These sounding frames have varying types and formats. The field in which training symbols may be transmitted can be a long training field (LTF) or similar field.

The following figure shows an example embodiment of the exchange of sounding-related frames between one beamformer and one or several beamformees.

FIG. 1 is a diagram of one embodiment of a beamforming or sounding procedure. The sounding procedure where there is a single STA that is a beamformee is referred to as a single-user (SU) procedure. In the SU case, the beamformer sends a sounding frame, such as a null data packet announcement (NDPA), followed by a short interframe space (SIFS). The NDPA serves to notify the STA that is to be the beamformee of the initiation and parameters of the sounding procedure. The beamformer then sends another sounding frame, such as a null data packet (NDP). The format of this packet is such that it contains a set of symbols that are read by the beamformee to determine the conditions of the channel over which the NDP is sent. The beamformee then generates a beamforming report that includes the feedback, referred to as explicit feedback, for the beamformer. This beamforming report is then returned to the beamformer after a SIFS in a sounding response frame, such as a beamforming report message, for example, a very high throughput (VHT) compressed beamforming report. The compressed beamforming report can also be a high efficiency (HE) compressed beamforming report or similar message.

In cases where there are multiple STAs in a WLAN that will participate as beamformees, such as the case illustrated in FIG. 1, the procedure is referred to as a multi-user (MU) beamforming procedure. In this case, the beamformer sends a sounding frame, such as an NDPA, followed by a SIFS. The NDPA is sent to all STAs in the WLAN for which the sounding procedure is performed. In some embodiments, the NDPA is sent to a limited number of STAs for which the beamforming/sounding procedure is to be carried out (e.g., four STAs) to ensure the responses of the beamformees are current.

A first beamformee that receives the NDP Announcement frame (e.g., a very high throughput (VHT) NDPA) from the beamformer that contains the first beamformee's association identifier (AID) in the AID subfield of the first (or only) STA Info field in the NDPA and also receives a VHT NDP frame a SIFS after the VHT NDP Announcement frame will respond by transmitting a Physical Layer Convergence Protocol (PLCP) Protocol Data Unit (PPDU) containing its VHT Compressed Beamforming feedback a SIFS after the VHT NDP frame. For other beamformees indicated in the NDPA frame other than the first beamformee may transmit PPDUs containing their respective Compressed Beamforming feedback a SIFS after receiving a Beamforming Report Poll frame with receiver address (RA) matching its media access control (MAC) address.

Thus, the beamformer may repeat the beamforming procedure over multiple subsets of the STAs in a WLAN to have a steering matrix or compressed beamforming report for each STA that is to be a beamformee. The NDPA serves to notify the STAs that are to be the beamformees of the initiation and parameters of the sounding procedure. The NDPA may include a station list that specifies the STA ID and order of the stations in the sounding procedure. The beamformer then sends another sounding frame, such as a NDP. The format of this packet is such that it contains a set of symbols that are read by the beamformee to determine the conditions of the channel over which the NDP is sent. Each of beamformees then generates a beamforming report that includes the feedback, referred to as explicit feedback, for the beamformer. This beamforming report is then returned to the beamformer after a SIFS in a sounding response frame, such as a beamforming report message, for example, a VHT Compressed Beamforming Report. One STA at a time responds with the VHT Compressed Beamforming Report. In one example embodiment, after the first STA sends the VHT Compressed Beamforming Report followed by a SIFS, the beamformer sends a Beamforming Report Poll that requests the next STA to send a VHT Compressed Beamforming Report after a SIFS. This process continues until all of the STAs have responded.

The NDP frame is sent in a way that beamformees can estimate the wireless channel between each space-time stream of the beamformer and each receiver chain of the beamformee. For this purpose, the LTF field of an NDP frame (e.g., a VHT NDP frame) can be used for channel estimation by the beamformees. The LTF field is composed of a set of training symbols. These training symbols are composed of a set of tones or sub-channels that are divided into data tones, pilot tones, DC tones and null tones (discussed further herein below). The pilot tones serve as reference signals while the data tones convey data. Each is separately processed using matrices to interpret the respective signals and, in the case of the sounding procedure, to perform channel estimation.

For example, the data tones of each VHT-LTF symbol are multiplied by entries belonging to a matrix $P_{VHTLTF}$, to enable channel estimation at the beamformee. The pilot tones of each VHT-LTF symbol are multiplied by the entries of another matrix $R_{VHTLTF}$. The multiplication of the pilot tones in the VHT-LTF symbol by the $R_{VHTLTF}$ matrix instead of the $P_{VHTLTF}$ matrix allows receivers to track phase and frequency offset during MIMO channel estimation using the VHT-LTF. The number of VHT-LTF symbols, $N_{VHTLTF}$, is a function of the total number of space-time streams $N_{STS,total}$ as shown in Table I below. As a result the VHT-LTF field consists of one, two, four, six or eight symbols.

TABLE I

| $N_{STS,\ total}$ | $N_{VHTLTF}$ |
| --- | --- |
| 1 | 1 |
| 2 | 2 |
| 3 | 4 |
| 4 | 4 |
| 5 | 6 |
| 6 | 6 |
| 7 | 8 |
| 8 | 8 |

$P_{VHTLTF}$ matrix that is used for data tones is expressed as below:

$$P_{VHTLTF} = \begin{cases} P_{4\times4}, N_{STS,total} \leq 4 \\ P_{6\times6}, N_{STS,total} = 5, 6 \\ P_{8\times8}, N_{STS,total} = 7, 8 \end{cases}$$

where, $$P_{4\times4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix},$$

$$P_{6\times6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix}$$

where $w = \exp(-j2\pi/6)$ $$P_{8\times8} = \begin{bmatrix} P_{4\times4} & P_{4\times4} \\ P_{4\times4} & -P_{4\times4} \end{bmatrix}$$

Also, a $R_{VHTLTF}$ matrix can be expressed as below:

$[R_{VHTLTF}]_{m,n} = [P_{VHTLTF}]_{l,n}, 1 \leq m, n \leq N_{VHTLTF}$

Because different matrices are multiplied for pilot tones and data tones, respectively, the beamformee that receives an NDP frame is able to discern which tones are for pilot and which tones are for data transmission, or put differently the respective locations of each. As the tone location of pilot and data tones is defined in the IEEE 802.11 standard, there was previously no ambiguity in figuring out which matrix is utilized for each tone, at least for the VHT frame format. However, in other possible frame formats supporting an Orthogonal Frequency Division Multiple Access (OFDMA) mechanism, such as a High Efficiency (HE) PPDU frame format, the tone locations may not be in a fixed location even for a given format. The location of pilot tones and data tones may depend on the resource allocation format, which renders a sounding process more complicated.

For the next generation WLAN system, e.g., WLAN systems that may be defined by IEEE 802.11ax, a new frame format may be defined to cope with high density WLAN environments (i.e., High-Efficiency (HE) frame formats). Key features of the HE frame formats include: an HE PPDU may include a legacy preamble (e., L-STF, L-LTF and L-SIG), duplicated on each 20 MHz channel, for backward compatibility with legacy devices; HE-SIG-A (using a discrete Fourier transform (DFT) period of 3.2 µs and subcarrier spacing of 312.5 kHz) is duplicated on each 20 MHz after the legacy preamble (where the legacy preamble may include an L-SIG field and a repeated L-SIG field (i.e., the RL-SIG) to indicate common control information; the HE-LTF may have a structure that uses the P matrix in the data tones as defined in IEEE 802.1ac, where in the data tones, every space-time stream is spread over all HE-LTF symbols by one row of the P matrix, and where different space-time streams use different rows in the P matrix; the HE-PPDU may support several LTF modes including an HE-LTF symbol duration of 6.4 microseconds (µs) excluding guard interval (GI) (Equivalent to modulating every other tone in an OFDM symbol of 12.8 µs excluding GI, and then removing the second half of the OFDM symbol in time domain) and HE-LTF symbol duration of 12.8 µs excluding GI; in an HE PPDU, the HE-LTF section may start at the same point of time and end at the same point of time across all users; data symbols in an HE PPDU may use a DFT period of 12.8 µs and subcarrier spacing of 78.125 kHz; data symbols in an HE PPDU may also support guard interval durations of 0.8 µs, 1.6 µs and 3.2 µs.

The VHT Compressed Beamforming feedback carries explicit feedback information in the form of angles representing compressed beamforming feedback matrices V for use by a transmitting beamformer to determine steering matrices Q, examples of which are described in 9.32.3 (Explicit feedback beamforming) and 20.3.12.3 (Explicit feedback beamforming) of IEEE 802.11 REVmc/D4.0 standard (Wireless LAN Medium Access Control (MAC) and Physical layer (PHY) Specifications).

The size or amount of data in in the compressed beamforming feedback, for example, VHT Compressed Beamforming feedback, is based primarily on the VHT Compressed Beamforming Report field. The structure and order of the VHT Compressed Beamforming Report information is defined as set forth below in Table II, where Na is the number of angles used for the compressed beamforming feedback matrix subfield:

TABLE II

| Field | Size (bits) | Meaning |
|---|---|---|
| Average SNR of Space-Time Stream 1 | 8 | Signal-to-noise ratio at the beamformee for space-time stream 1 averaged over all data subcarriers. See Table 8-69 (Average SNR of Space-Time Stream i subfield). |
| ... | ... | ... |
| Average SNR of Space-Time Stream Nc | 8 | Signal-to-noise ratio at the beamformee for space-time stream Nc averaged over all data subcarriers. See Table 8-69 (Average SNR of Space-Time Stream i subfield). |
| Compressed Beamforming Feedback Matrix V for subcarrier k = scidx(0) | Na × $(b_\psi + b_\phi)/2$ | Compressed beamforming feedback matrix as defined in Table 8-65 (Order of angles in the Compressed Beamforming Feedback Matrix subfield) |
| Compressed Beamforming Feedback Matrix V for subcarrier k = scidx(1) | Na × $(b_\psi + b_\phi)/2$ | Compressed beamforming feedback matrix as defined in Table 8-65 (Order of angles in the Compressed Beamforming Feedback Matrix subfield) |
| Compressed Beamforming Feedback Matrix V for subcarrier k = scidx(2) | Na × $(b_\psi + b_\phi)/2$ | Compressed beamforming feedback matrix as defined in Table 8-65 (Order of angles in the Compressed Beamforming Feedback Matrix subfield) |
| ... | ... | ... |
| Compressed Beamforming Feedback Matrix V for subcarrier k = scidx(Ns − 1) | Na × $(b_\psi + b_\phi)/2$ | Compressed beamforming feedback matrix as defined in Table 8-65 (Order of angles in the Compressed Beamforming Feedback Matrix subfield) |

NOTE-
scidx( ) is defined in Table 8-68 (Subcarriers for which a Compressed Beamforming Feedback Matrix subfield is sent back)

In Table II, Ns is the number of subcarriers or tones for which the Compressed Beamforming Feedback Matrix subfield is sent back to the beamformer. A beamformee may choose to reduce Ns by using a method referred to as grouping, in which only a single Compressed Beamforming Feedback Matrix is reported for each group of Ng adjacent subcarriers or tones. Ns is a function of the Channel Width and Grouping subfields in the VHT MIMO Control field. As described herein further below, the embodiments encompass a method of reducing the amount of data is returned in the Compressed Beamforming Feedback Matrix in addition to the method and system for negotiating the operating mode for improving the accuracy of the phase and frequency compensation of the sounding procedure.

Figure 2:
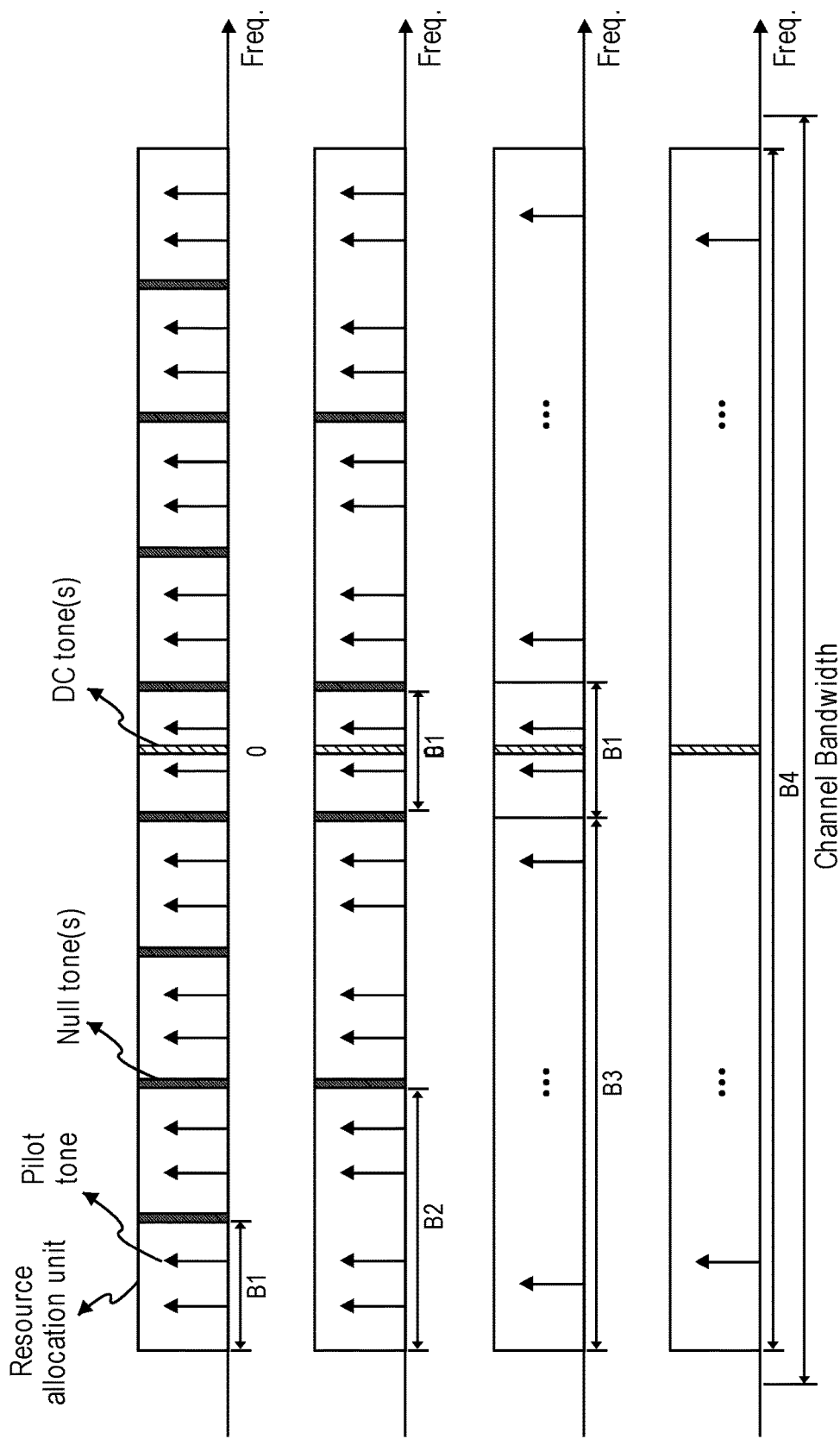
FIG. 2 is a diagram of one embodiment of the OFDM symbol structure for a sounding frame with a 20 MHz Bandwidth.

FIG. 2 is a diagram of one embodiment of the OFDM symbol structure for a sounding frame with a 20 MHz Bandwidth. For a given channel bandwidth, there exist multiple basic resource allocation units which have different occupied bandwidth. In this illustrated example, there are four different basic resource allocation units, whose occupied bandwidth is B1, B2, B3, and B4, respectively. As used here the occupied bandwidth indicates a number of tones or sub-channels. And, each resource allocation unit has pilot tones, wherein pilot tones are usually used for frequency offset compensation. Also, in the center of the channel bandwidth, there exist one or more DC tones such that no information is conveyed. On top of DC tones, there may exist several null tones between adjacent resource allocation units, wherein null tones are not included in any of basic resource allocation unit and do not convey any data.

As further illustrated in FIG. 2, B1 is the smallest resource allocation unit in the example. Resource allocation units are uniform for a given frame. Thus, if smaller resource allocation units are utilized, then more resource allocation units are needed relative to larger resource allocation units for a given channel bandwidth. For example, if B1 is the resource allocation unit, then in the example, 9 B1 blocks are needed to occupy the whole channel bandwidth, which implies that a single channel bandwidth can support up to 9 STAs simultaneously. In contrast, in this example, B4 is the largest resource allocation unit such that only one STA can be handled in the case B4 is utilized, because B4 is the size of the whole channel bandwidth. Therefore, the resource allocation unit of B4 is used for single STA transmission (OFDM) (i.e. a single user (SU) mode), and resource allocation units B1, B2, and B3 are used for multiple STA transmission (OFDMA) (i.e., examples of a multi-user (MU) mode).

A resource allocation unit with different occupied bandwidth has a different number of pilot tones and has different pilot density. For example, for the smallest resource allocation unit, B1, there are 2 pilot tones assigned out of total 26 tones (2 pilot tones and 24 data tones) for a single resource allocation unit. However, in the largest resource allocation unit, B4, there are 8 pilot tones assigned out of total 242 tones (8 pilot tones and 234 data tones). Therefore, in terms of pilot density, B1 has more pilot density (2/26=7.7%) than that for B4 (8/242=3.3%), where pilot density is a description of the ratio of pilot tones to total number of data and pilot tones. A lower pilot density enables the transfer of a greater amount of data in a given frame. However, a higher pilot density enables a higher degree of accuracy in phase and frequency compensation.

In case of an NDP frame that is used for channel sounding, because an NDP frame does not include any data payload part in the frame, any combination of resource allocation units can be used. However, if a combination of resource allocation units used in the NDP sounding frame is different from that for actual data transmission, it may result in performance degradation in terms of accurate beamforming.

Figure 3:
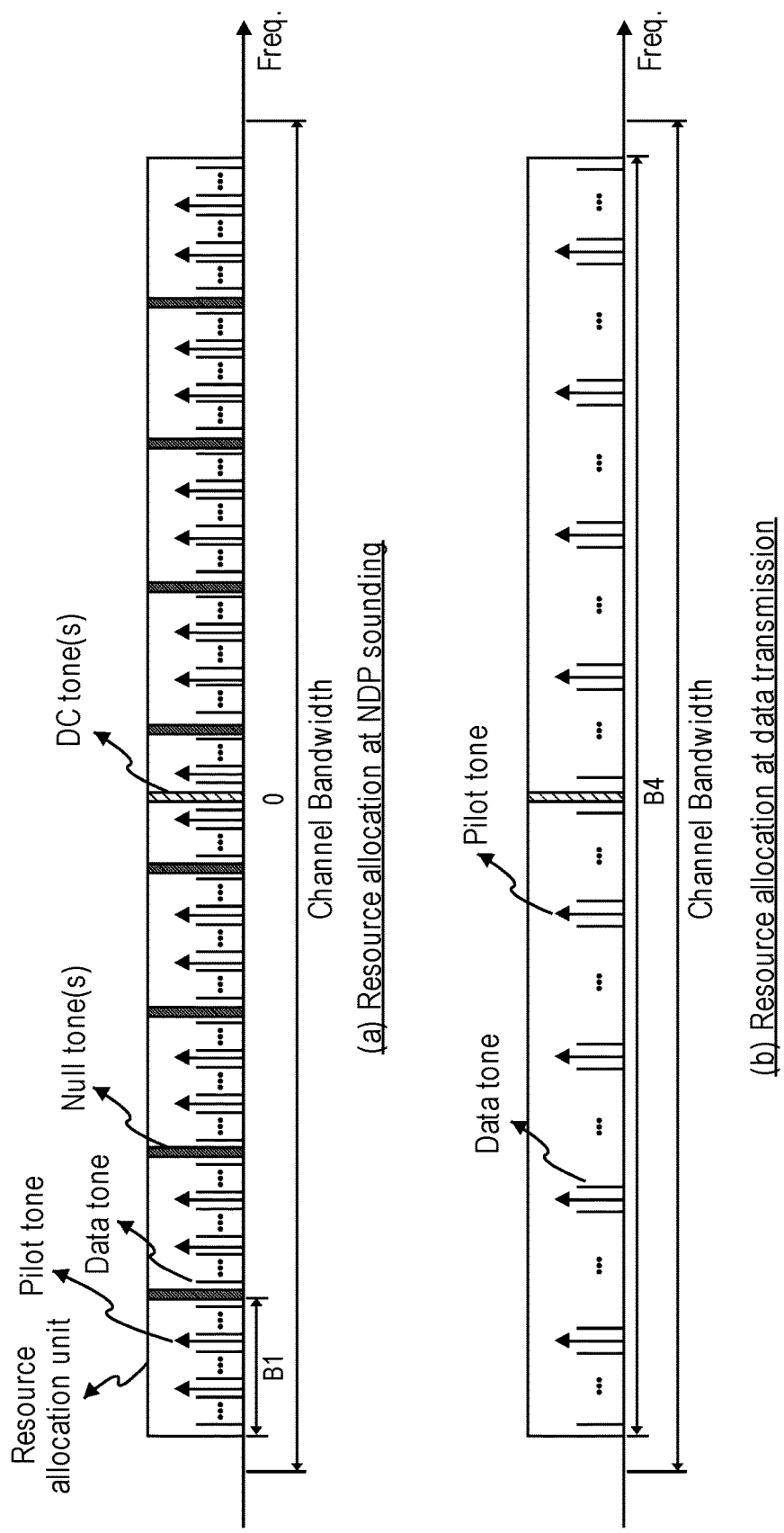
FIG. 3 is a diagram of two channel bandwidths with differing resource allocation units for sounding and data transmission respectively.

FIG. 3 is a diagram of two channel bandwidths with differing resource allocation units for sounding and data transmission respectively. The diagram of FIG. 3 illustrates the issue of having differing resource allocation units for the sounding and data transmission. Similar to the above example of FIG. 2, the whole channel bandwidth can be filled up with 4 different resource allocation units (B1, B2, B3, and B4). In this example, the NDP sounding frame is composed of 9 B1 resource allocation units, wherein each B1 resource allocation unit includes 24 data tones and 2 pilot tones. Also, there are a total of 8 null tones that no data and pilot is assigned to as well as a DC tone. However, after the sounding procedure is done, if an AP allocates a single STA for a whole channel bandwidth using the resource allocation of B4 (e.g., a SU mode), wherein B4 includes 234 data tones and 8 pilot tones the sounding procedure may be found to produce less accurate results than desired in making phase and frequency compensation.

For a STA that is allocated the whole bandwidth using resource allocation unit of B4 (e.g., a SU mode), the STA needs MIMO channel information for all of the 234 data tones. As mentioned above, in the LTF field of each frame, the $P_{VHTLTF}$ matrix is multiplied only with data tones whereas the $R_{VHTLTF}$ matrix is multiplied with pilot tones, and a receiver of a frame (i.e., a beamformee) can estimate the MIMO channel only when $P_{VHTLTF}$ matrix is multiplied. Therefore, because resource allocation unit of B1 (i.e., an MU mode) is used for the NDP sounding frame at the time of channel sounding, the STA can obtain MIMO channel information only for 24×9=216 tones. Therefore, the STA cannot feedback MIMO channel information for the 234 tones. Instead only 216 tones of feedback are provided resulting in 18 missing tones, which results in performance degradation.

The embodiments provide a method to overcome at least this problem. The embodiments provide methods of determining a weight matrix for each tones in the LTF field of the NDP sounding frames. The basic principle of these embodiments is that when there are more than one mode of operation at a given channel bandwidth, the mode of operation for the NDP sounding frame is chosen to have the minimum number of pilot tones (or to have the minimum pilot density) within the given channel bandwidth. Or, stated differently, when there are more than one modes of operation at a given channel bandwidth, the mode of operation for NDP sounding frame is chosen to have the maximum number of data tones within the given channel bandwidth. As used herein, a 'mode of operation' refers to a given combination of allocated frequency resources on a per STA basis. These modes of operation can correlate with SU and MU modes, such as the example modes with resource allocation units B1-B4 discussed with regard to FIGS. 2-5. Each mode has a differing pilot density where the SU mode has the lowest pilot density and MU modes have increasing pilot density as the resource allocation unit becomes smaller. These SU and MU modes can be compatible with specific bandwidths. The MU mode can include multiple resource units, whereas the SU mode uses a single resource unit that is commensurate with the bandwidth. Similarly, the SU mode and MU mode may have specific PPDUs such as a HE MU PPDU.

Figure 4:
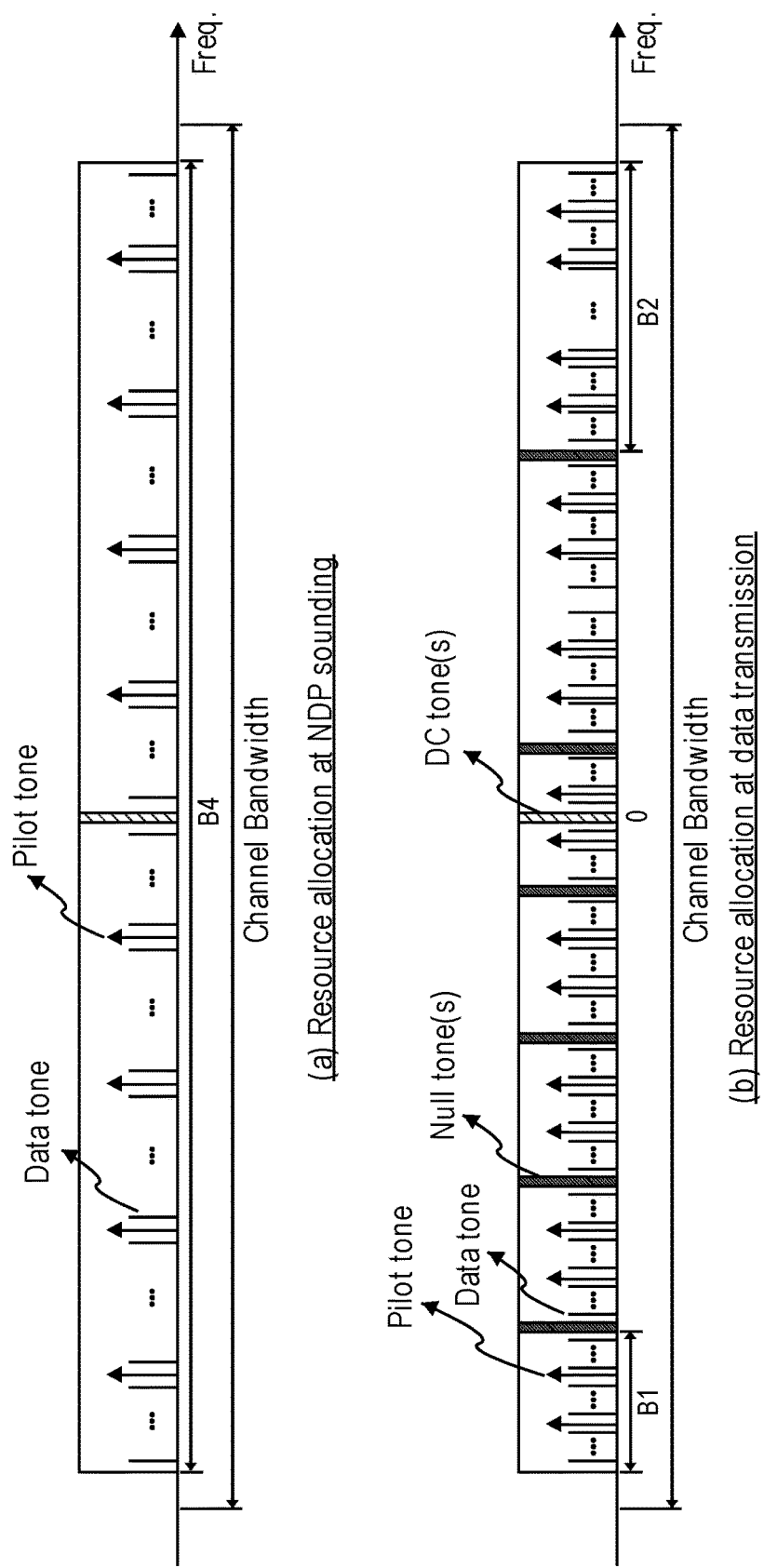
FIG. 4 is a diagram of one embodiment of an application of the improved sounding process.

FIG. 4 is a diagram of one embodiment of an application of the improved sounding process. FIG. 4 illustrates the same operation scenario shown in the previous example in FIG. 3, where the whole channel bandwidth can be filled up with 4 different resource allocation units (B1, B2, B3, and B4). As mentioned above, out of the 4 different resource allocation units, the pilot density of B4 (i.e., corresponding to a SU mode) is the minimum pilot density out of the possible resource allocation units. Therefore, the embodiments provide a method for using an NDP sounding frame that is sent with tone allocation corresponding to B4 in such a scenario. In this example, after the channel sounding is done, 7 STAs are allocated using either resource allocation unit B1 or B2 (e.g., corresponding to MU modes). Because the sounding was performed with the lowest possible pilot density of the available resource allocation units, the resource allocation units for all 7 STAs are based on estimates of the MIMO channel using resource allocation unit B4, wherein all data tones in resource allocation units B1 and B2 correspond to data tones in resource allocation unit B4, thus, all 7 STAs can utilize feedback channel information on every data tone thereby ensuring accurate frequency and phase compensation for each data tone to be utilized in data transmission.

Figure 5:
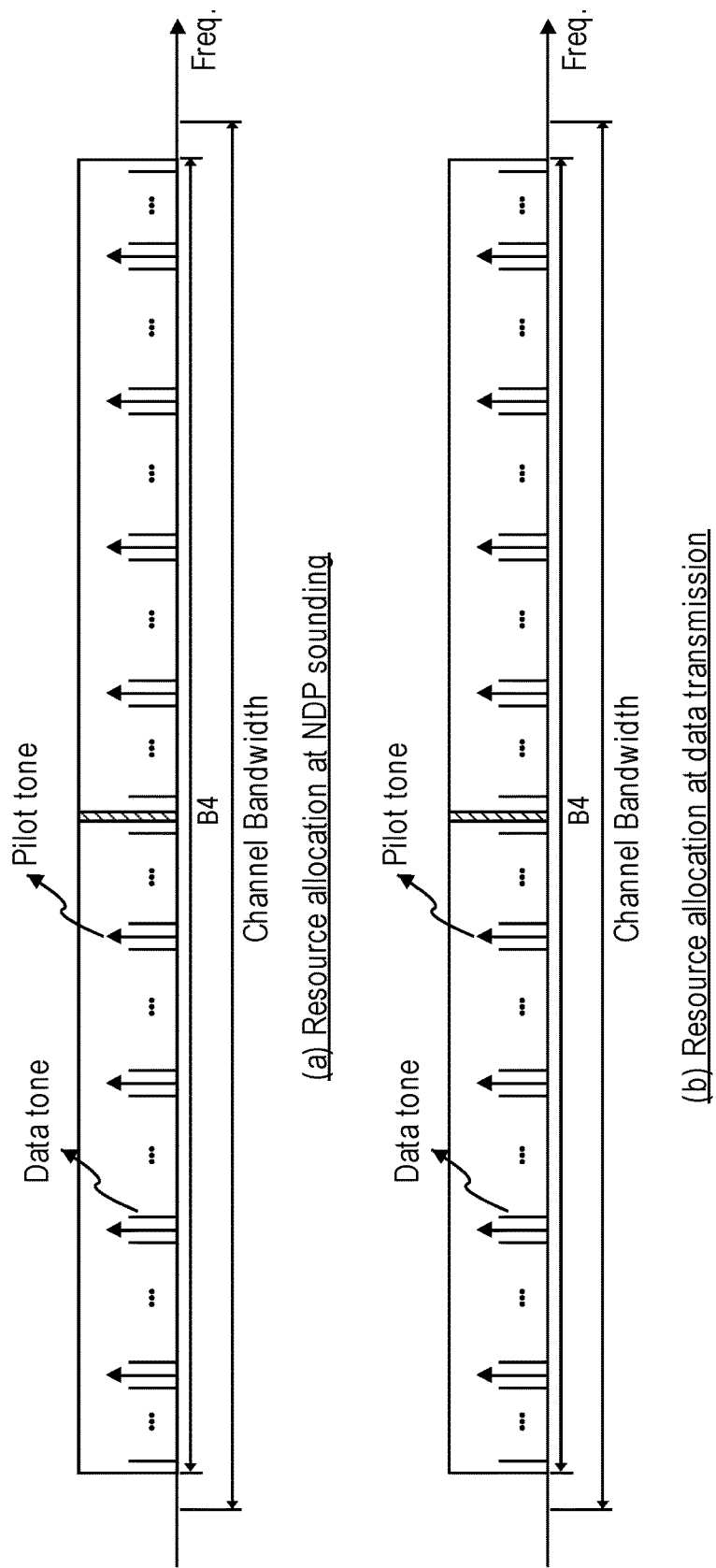
FIG. 5 is a diagram of one embodiment of another application of the improved sounding process.

FIG. 5 is a diagram of one embodiment of another application of the improved sounding process. In this further example, after NDP sounding procedure using resource allocation unit B4, an AP (i.e., the beamformer) allocates a STA for full channel bandwidth using resource allocation unit B4 (i.e., corresponding to an SU mode). In this example, as resource allocation unit B4 was used for channel sounding, and tone locations for data and pilots are exactly the same with that for actual data transmission, the method provides a perfect match for per channel sounding.

Figure 6:
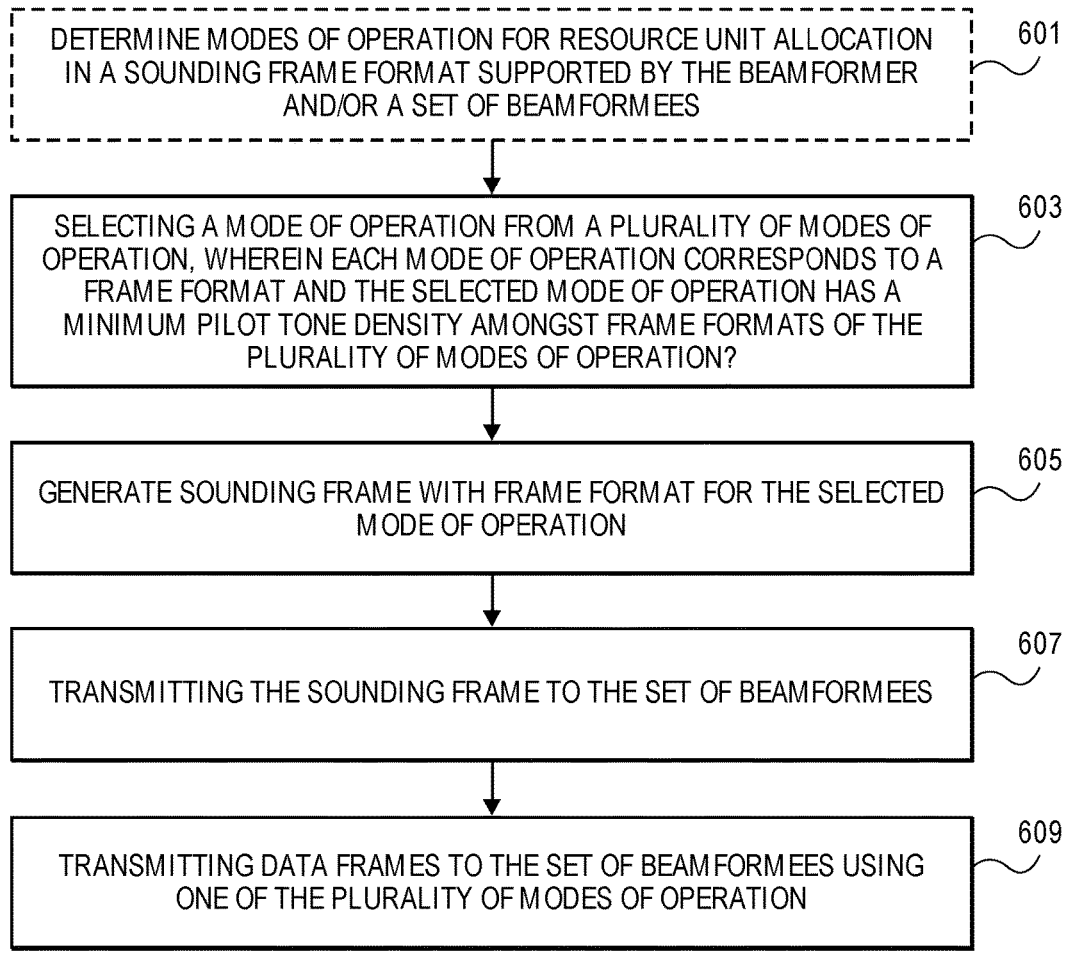
FIG. 6 is a flowchart of one embodiment of the process for the improved sounding procedure implemented by the beamformer.

The embodiments can be implemented in various different ways, all without departing from the spirit or scope of the present invention. FIG. 6 is a flowchart of one embodiment of the process for the improved sounding procedure implemented by the beamformer. This embodiment is provided by way of example and not limitation. The process is implemented by the beamformer before the sending of a sounding frame such as an NDP frame.

In one embodiment, the process begins by determining the available modes of operation for resource allocation units in the WLAN (Block 601). The beamformee and beamformers in the WLAN may have a set of resource allocation units that are mutually supported. Further, the beamformer may be aware of the number of STAs in the WLAN. This information and similar information can be taken into consideration when selecting a resource allocation unit to utilize for the sounding procedure. The range of possible resource allocation units can also include various configurations of such resource allocation units. Thus, the size and structure of the available resource allocation units is considered. This determination of the available modes of operation may take place at a time of configuration for a beamformer, during preliminary communication with beamformees or at any time preceding the sending of a sounding frame. This process need not be repeated with each sounding frame that is sent. The available modes of operation may be determined along with the scheduling of sounding resources which may further include determining user selection, channel bandwidth and similar sounding configuration. In some embodiments, the beamformer also selects a bandwidth for a sounding frame to be generated. This influences the subsequent selection of the mode of operation such that the frame format of the mode of operation to be selected must operate at the selected bandwidth (e.g., SU mode or MU modes compatible with a selected bandwidth). Similarly, the set of modes of operation (and corresponding frame formats) from which selection can be made may also be limited by other restrictions of the WLAN in which the beamformer operates (e.g., regulatory, protocol, or administrative limitations).

With the information about the available modes of operation determined, the process determines and selects the mode of operation having a frame format with a minimum pilot tone density (Block 603). As illustrated in FIGS. 2-5, each of the modes of operation corresponds to a frame format. The selected mode of operation has the lowest pilot tone density of the formats corresponding to the available modes of operation for the beamformer. In some embodiments, the modes of operation include a SU mode and MU mode, where the SU mode (or SU PPDU) has the lowest pilot tone density and is thus selected. The MU mode may utilize a high efficiency (HE) PPDU. In addition, each mode of operation can be considered to have a differing resource unit allocation, such that the selection is amongst a set of modes of operation having differing resource allocation units that are compatible with a selected bandwidth. This includes some modes of operation having resource allocation units with multiple resource units. The multiple resource units may be portions of a selected bandwidth, whereas if a single resource unit is selected then it may be the entire selected bandwidth.

The sounding procedure can then continue with the use of the resource allocation unit and the configuration of such resource allocation unit when generating and sending the sounding frame (e.g., an NDP frame) (Block 605). With the sounding frame so constructed, the sounding frame can then be sent to the beamformee(s) (Block 607). In some embodiments, the process may iterate through a set of beamformees with the same parameters utilized for the sounding frame sent to each. In response, the compressed beamforming feedback report is received from which the steering matrix can be constructed. Once the sounding procedure has resolved the steering matrix for a set of beamformees, data transmissions using the steering matrix can begin. The beamformer can communicate with each of the set of beamformees using any of the available modes of operation (Block 609).

In some embodiments, the beamformer may further indicate the grouping of tones in the sounding frame for which the feedback is to be provided to reduce the amount of data that must be sent in the feedback. These embodiments can be utilized in combination with the process for selecting the mode of operation or can be separately implemented.

In some embodiments, feedback is provided in the form of a VHT Compressed Beamforming Report, where it is used for a HE-PPDU frame format. The amount of data provided by such feedback reports creates several issues to be resolved, and one of the issues is the formation of LTF field in the sounding frame and related feedback. As HE-PPDU frame format allows compressed LTF symbols, which is a symbol duration of 6.4 µs excluding GI (equivalent to modulating every other tone in an OFDM symbol of 12.8 µs excluding GI, and then removing the second half of the OFDM symbol in time domain), it is possible that not all subcarriers or tones are loaded (i.e., convey data) in a frequency domain.

Figure 7:
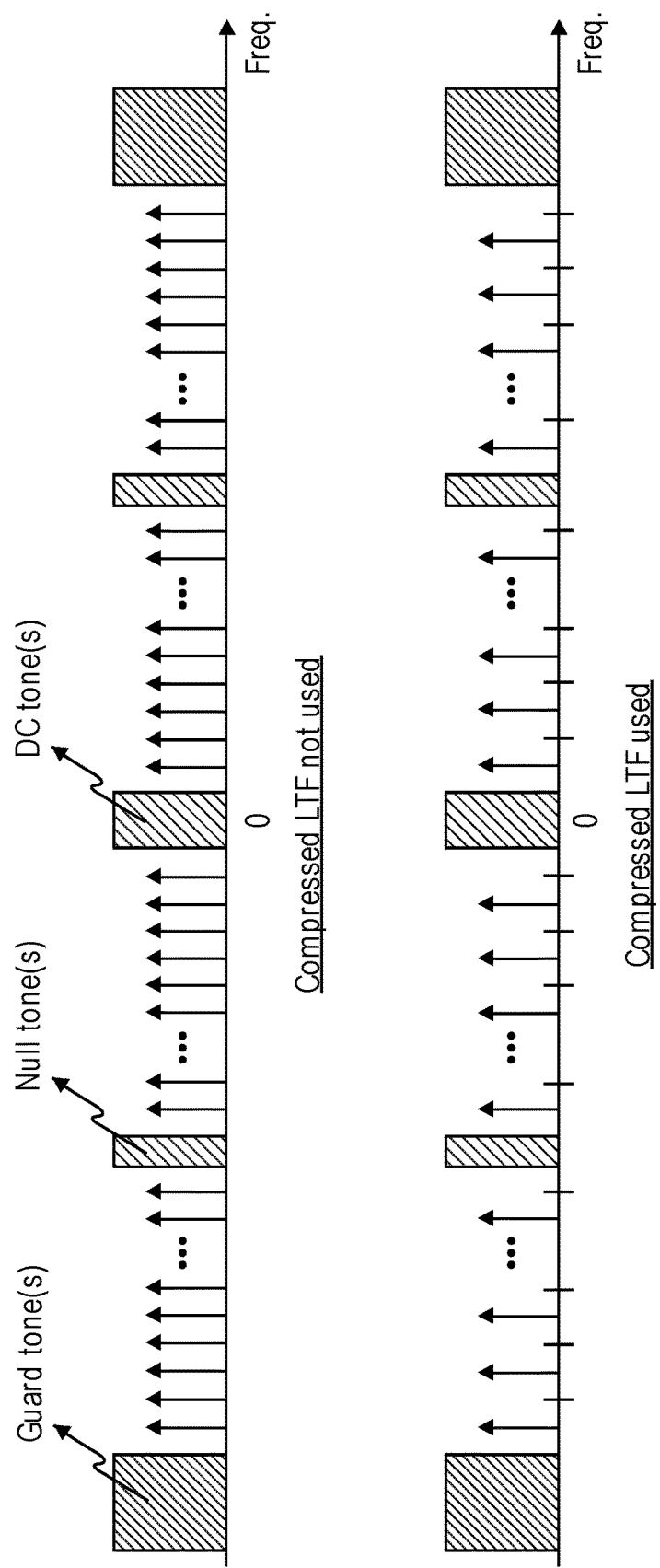
FIG. 7 is a diagram of one example of difference in structure between a compressed LTF and a non-compressed LTF.

FIG. 7 is a diagram of one example of difference in structure between a compressed LTF and a non-compressed LTF. The illustration shows tone or subcarrier loading for both cases of using and not using compressed LTF symbol. In the case where compressed LTF symbols are not used, all tones or subcarriers in the frequency domain are loaded with predetermined LTF sequences except several tones that are designated to be not loaded such as DC tone(s), null tone(s), and guard tone(s). However, in the case where compressed LTF symbols are used, only even or odd tones or subcarriers may be loaded in the LTF symbols, thus only half of the tones or subcarriers provide meaningful data or signals in comparison to the case where compressed LTF symbols are not used.

In the context of beamforming in the sounding procedure, if the compressed LTF symbols are used in an NDP sounding frame, there will only be meaningful reference information in a part of the available tones of subcarriers. Thus, it is hard for a beamformee to calculate the right beamforming weight matrix for all possible tones or subcarriers.

To overcome this issue, one of the possible ways of providing a feedback beamforming weight matrix for all tones or subcarrier channels in a channel bandwidth is to interpolate the wireless medium using adjacent tones. For example, if meaningful channel information is available only on frequency subcarriers of f0 and f2, but there's no meaningful channel information on tone or frequency subcarrier f1, wherein f0, f1, and f2 are adjacent frequency subcarriers in ascending order, and the estimated channel information at frequency subcarrier f0, f1, and f2 are denoted by H0, H1, and H2, respectively, the channel information of H1 can be approximated as $$H_1 \cong \frac{H_0 + H_2}{2}$$

However, in the case where a wireless channel fluctuates in a frequency domain abruptly, the linear interpolation approximation mentioned above cannot reflect the wireless channel properly, which may result in the loss of possible beamforming gain. Moreover, even though there are only half of normal data points of meaningful information available in the frequency subcarriers, the beamformee needs to calculate the beamforming weight matrix for the entire bandwidth, and the beamformee also has to perform the interpolation process. This additional functionality increases the complexity of the operations to be performed on the beamformee side.

This additional complexity can be avoided if the beamformee calculates the beamforming weight matrix using only tones or frequency subcarriers where there is meaningful information in the LTF symbols, and this is applicable when the beamformee feeds back the beamforming weight matrix information (Compressed beamforming feedback matrix) and Ng equals to greater than 1 in the sounding frame. In other words, this process is applicable where the Ng indicates that the received frame does not utilize all data subcarriers of the LTF symbol and they are instead grouped adjacent subcarriers. However, even in the case where Ng equals to greater than 1, unless the frequency subcarriers that represent the group of adjacent subcarriers coincide with frequency subcarriers that are LTF symbols that carry meaningful information, it is possible that this may not work properly. Thus, the structure of the valid LTF symbols must be known.

Moreover, in case wireless channel is flat in frequency domain such that wireless channel does not change significantly among multiple adjacent frequency subcarriers, the beamformer can send NDP sounding frame with compressed LTF symbols. In this case, as the wireless channel does not change significantly in frequency domain, feedback of beamforming weight matrix with Ng value greater than 1 is preferred. However, as it is a beamformee not a beamformer that decides the Ng value of the channel feedback, if the beamformee does not recognize that channel is flat, it will keep feedback with Ng equals to 1. In this case, the amount of feedback becomes larger compared to the required feedback, which will decrease the overall system throughput and consumes more power in the beamformee side.

To overcome those issues mentioned, the embodiments provide a process to make the sounding procedure more efficient and save power consumption at the beamformee side. The basic principle of the embodiments is that if an NDP frame is sent in a frame format that allows compressed LTF symbols, the Ng of the Compressed Beamforming frame will be set to greater than 1 if the LTF symbols of the NDP frame is compressed. Also, in case the LTF symbols of the NDP frame are compressed, the frequency subcarriers that the Compressed Beamforming frame reports the beamforming weight matrix will be a subset of the frequency subcarriers aligned with the LTF symbols of the NDP frame that contain meaningful information.

Table III shows an example of requirements for the Ng of the Compressed Beamforming frame depending on the LTF symbols compression of the NDP frame. As shown below, a beamformee reports the Compressed Beamforming frame using an Ng at least greater than or equal to 2 if the LTF symbols in the preceding NDP frame are compressed (e.g., there is an HE-LTF symbol duration of 6.4 μs excluding GI), whereas all possible Ng values are allowed if the LTF symbols in the preceding NDP frame are not compressed (e.g., where the HE-LTF symbol duration of 12.8 μs excluding GI).

TABLE III

| LTF Compression in NDP frame | Requirements for Ng of Compressed Beamforming frame |
| --- | --- |
| Not Compressed (HE-LTF symbol duration of 12.8 μs excluding GI) | Ng ≥ 1 |
| Compressed (HE-LTF symbol duration of 6.4 μs excluding GI) | Ng ≥ 2 |

Table IV shows another example of requirements for Ng of Compressed Beamforming frame depending on the LTF symbols compression of the NDP frame. In this example, there are three different types of LTF compression: i) no compression, ii) ×2 compression, iii) ×4 compression. In the case of ×2 compression, the HE-LTF symbol duration is 6.4 μs excluding GI and it is equivalent to modulating every other tone in an OFDM symbol of 12.8 μs excluding GI, and then removing the second half of the OFDM symbol in the time domain. For ×4 compression, the HE-LTF symbol duration is 3.2 μs excluding GI and it is equivalent to modulating one in every four tones in an OFDM symbol of 12.8 μs excluding GI and then removing the second, third, and fourth quarter of the OFDM symbol in the time domain. Since the LTF symbols of NDP sounding frame for the ×2 compression case has meaningful information in every other frequency tone, the beamformee reports the beamforming weight matrix using an Ng at least greater than or equal to 2 in this case. Similarly, since the LTF symbols of the NDP sounding frame for the ×4 compression case have meaningful information in one of every four frequency tones, the beamformee reports the beamforming weight matrix with using an Ng of at least greater than or equal to 4 in this case.

TABLE IV

| LTF Compression in NDP frame | Requirements for Ng of Compressed Beamforming frame |
| --- | --- |
| Not Compressed (HE-LTF symbol duration of 12.8 μs excluding GI) | Ng ≥ 1 |
| x2 Compressed (HE-LTF symbol duration of 6.4 μs excluding GI) | Ng ≥ 2 |
| x4 Compressed (HE-LTF symbol duration of 3.2 μs excluding GI) | Ng ≥ 4 |

Table V shows another example of the requirements for the Ng of a Compressed Beamforming frame depending on the LTF symbols compression of the NDP frame and NDP frame PPDU format. In this example, there are two different types of NDP frame PPDU format. First one is a VHT NDP frame format and the second one is a HE NDP frame format. In the case of the VHT NDP frame format, the VHT-LTF symbol duration is 3.2 us excluding GI. And, for the case of HE NDP frame format, the HE-LTF symbol duration can be either 12.8 μs or 6.4 μs excluding GI depending on LTF compression. As shown in the table, a beamformee reports the Compressed Beamforming frame using the Ng of at least greater than or equal to 2 if the preceding NDP frame follows HE-NDP frame format and the HE-LTF symbols in the preceding NDP frame is compressed (i.e., the HE-LTF symbol duration of 6.4 μs excluding GI), whereas all possible Ng values are allowed if the preceding NDP frame follows VHT-NDP frame format or if the preceding NDP frame follows HE-NDP frame format and the HE-LTF symbols in the preceding NDP frame is not compressed (i.e., the HE-LTF symbol duration of 12.8 μs excluding GI).

TABLE V

| NDP frame format | LTF Compression in NDP frame | Requirements for Ng of Compressed BF frame |
| --- | --- | --- |
| VHT NDP frame format | N/A | Ng ≥ 1 |
| HE NDP frame format | Not Compressed (HE-LTF symbol duration of 12.8 μs excluding GI) | Ng ≥ 1 |
| HE NDP frame format | Compressed (HE-LTF symbol duration of 6.4 μs excluding GI) | Ng ≥ 2 |

Table VI shows another example of requirements for Ng of Compressed beam framing frame depending on the LTF symbols compression of the NDP frame and NDP frame PPDU format. In this example, there are two different types of NDP frame PPDU format. First one is a VHT NDP frame format and the second one is a HE NDP frame format. In the case of the VHT NDP frame format, the VHT-LTF symbol duration is 3.2 μs excluding GI. And, for the case of HE NDP frame format, the HE-LTF symbol duration can be 12.8 μs, 6.4 μs, or 3.2 μs excluding GI depending on the level of LTF compression (no compression, ×2 compression, ×4 compression). In the case of ×2 compression, the HE-LTF symbol duration is 6.4 us excluding GI and it is equivalent to modulating every other tone in an OFDM symbol of 12.8 μs excluding GI, and then removing the second half of the OFDM symbol in the time domain. For ×4 compression, the HE-LTF symbol duration is 3.2 μs excluding GI and it is equivalent to modulating one in every four tones in an OFDM symbol of 12.8 μs excluding GI and then removing the second quarter of the OFDM symbol in the time domain.

As shown in the table, a beamformee reports the Compressed Beamforming frame using an Ng at least greater than or equal to 4 if the preceding NDP frame follows the HE-NDP frame format and the HE-LTF symbols in the preceding NDP frame is ×4 compressed (i.e., the HE-LTF symbol duration of 3.2 μs excluding GI). A beamformee shall report the Compressed BF frame using the Ng at least greater than or equal to 2 if the preceding NDP frame follows the HE-NDP frame format and the HE-LTF symbols in the preceding NDP frame is ×2 compressed (i.e., the HE-LTF symbol duration of 6.4 μs excluding GI). whereas all possible Ng values are allowed if the preceding NDP frame follows VHT-NDP frame format or if the preceding NDP frame follows the HE-NDP frame format and the HE-LTF symbols in the preceding NDP frame is not compressed (i.e., the HE-LTF symbol duration of 12.8 μs excluding GI).

TABLE VI

| NDP frame format | LTF Compression in NDP frame | Requirements for Ng of Compressed Beamforming frame |
|---|---|---|
| VHT NDP frame format | N/A | Ng ≥ 1 |
| HE NDP frame format | Not Compressed (HE-LTF symbol duration of 12.8 μs excluding GI) | Ng ≥ 1 |
| HE NDP frame format | x2 compressed (HE-LTF symbol duration of 6.4 μs excluding GI) | Ng ≥ 2 |
| HE NDP frame format | x4 compressed (HE-LTF symbol duration of 3.2 μs excluding GI) | Ng ≥ 4 |

In another example shown in Table VII, the beamformee can choose the Ng value from the candidate sets, wherein the candidate sets for Ng depends on the frame format and the compression level of the LTF symbols in the preceding NDP frame, wherein the candidate sets are shown in the table below. In this example, there are two different types of NDP frame PPDU format. The first one is a VHT NDP frame format and the second one is a HE NDP frame format. In the case of the VHT NDP frame format, the VHT-LTF symbol duration is 3.2 μs excluding GI. And, for the case of HE NDP frame format, the HE-LTF symbol duration can be either 12.8 μs or 6.4 μs excluding GI depending on LTF compression. As shown in the table, a beamformee shall report the Compressed BF frame with using any Ng value out of (2, 4, 8, 16) if the preceding NDP frame follows HE-NDP frame format and the HE-LTF symbols in the preceding NDP frame is compressed (HE-LTF symbol duration of 6.4 μs excluding GI). The beamformee shall report the Compressed BF frame with using any Ng value out of (1, 2, 4, 8, 16) if the preceding NDP frame follows HE-NDP frame format and the HE-LTF symbols in the preceding NDP frame is not compressed (HE-LTF symbol duration of 3.2 μs excluding GI). The beamformee shall report the Compressed Beamforming frame using any Ng value out of (1, 2, 4) if the preceding NDP frame follows VHT-NDP frame format.

TABLE VII

| NDP frame format | LTF Compression in NDP frame | Candidate sets for Ng |
|---|---|---|
| VHT NDP frame format | N/A | 1, 2, 4 |
| HE NDP frame format | Not Compressed (HE-LTF symbol duration of 12.8 μs excluding GI) | 1, 2, 4, 8, 16 |
| HE NDP frame format | Compressed (HE-LTF symbol duration of 6.4 μs excluding GI) | 2, 4, 8, 16 |

In another example shown in Table VIII, the beamformee can choose the Ng value from the candidate sets, wherein the candidate sets for Ng depends on the frame format and the compression level of the LTF symbols in the preceding NDP frame, wherein the candidate sets are shown in the table below. In this example, there are two different types of NDP frame PPDU format. The first one is a VHT NDP frame format and the second one is a HE NDP frame format. In the case of the VHT NDP frame format, the VHT-LTF symbol duration is 3.2 μs excluding GI. And, for the case of HE NDP frame format, the HE-LTF symbol duration can be 12.8 μs, 6.4 μs, or 3.2 μs excluding GI depending on the level of LTF compression (no compression, x2 compression, x4 compression). In case of x2 compression, the HE-LTF symbol duration is 6.4 μs excluding GI and it is equivalent to modulating every other tone in an OFDM symbol of 12.8 μs excluding GI, and then removing the second half of the OFDM symbol in the time domain. For x4 compression, the HE-LTF symbol duration is 3.2 μs excluding GI and it is equivalent to modulating one in every four tones in an OFDM symbol of 12.8 μs excluding GI and then removing from the second quarter of the OFDM symbol in the time domain. As shown in the table below, a beamformee shall report the Compressed BF frame with using any Ng value out of (4, 8, 16) if the preceding NDP frame follows HE-NDP frame format and the HE-LTF symbols in the preceding NDP frame is x4 compressed (HE-LTF symbol duration of 3.2 us excluding GI). The beamformee reports the Compressed BF frame using any Ng value out of (2, 4, 8, 16) if the preceding NDP frame follows the HE-NDP frame format and the HE-LTF symbols in the preceding NDP frame is x2 compressed (i.e., the HE-LTF symbol duration of 6.4 μs excluding GI). The beamformee reports the Compressed Beamforming frame using any Ng value out of (1, 2, 4, 8, 16) if the preceding NDP frame follows the HE-NDP frame format and the HE-LTF symbols in the preceding NDP frame are not compressed (i.e., the HE-LTF symbol duration of 3.2 μs excluding GI). The beamformee reports the Compressed Beamforming frame using any Ng value out of (1, 2, 4) if the preceding NDP frame follows the VHT-NDP frame format.

TABLE VIII

| NDP frame format | LTF Compression in NDP frame | Candidate sets for Ng |
|---|---|---|
| VHT NDP frame format | N/A | 1, 2, 4 |
| HE NDP frame format | Not Compressed (HE-LTF symbol duration of 12.8 μs excluding GI) | 1, 2, 4, 8, 16 |
| HE NDP frame format | x2 Compressed (HE-LTF symbol duration of 6.4 μs excluding GI) | 2, 4, 8, 16 |
| HE NDP frame format | x4 Compressed (HE-LTF symbol duration of 3.2 μs excluding GI) | 4, 8, 16 |

In another example, if the LTF symbol duration of the preceding NDP frame is 6.4 μs excluding GI (it is equivalent to modulating every other tone in an OFDM symbol of 12.8 μs excluding GI, and then removing the second half of the OFDM symbol in the time domain), a beamformee reports the beamforming weight matrix information only on first subcarriers that the LTF symbol of the preceding NDP frame has meaningful information or on the subset of the first subcarriers.

In another example, if the LTF symbol duration of the preceding NDP frame is 6.4 μs excluding GI (it is equivalent to modulating every other tone in an OFDM symbol of 12.8 μs excluding GI, and then removing the second half of the OFDM symbol in time domain), a beamformee shall report the Compressed BF frame with using Ng at least greater than or equal to 2, wherein the subcarriers for which a Compressed beamforming information is sent back are subset of subcarriers that the LTF symbol of the preceding NDP frame has meaningful information.

Figure 8A:
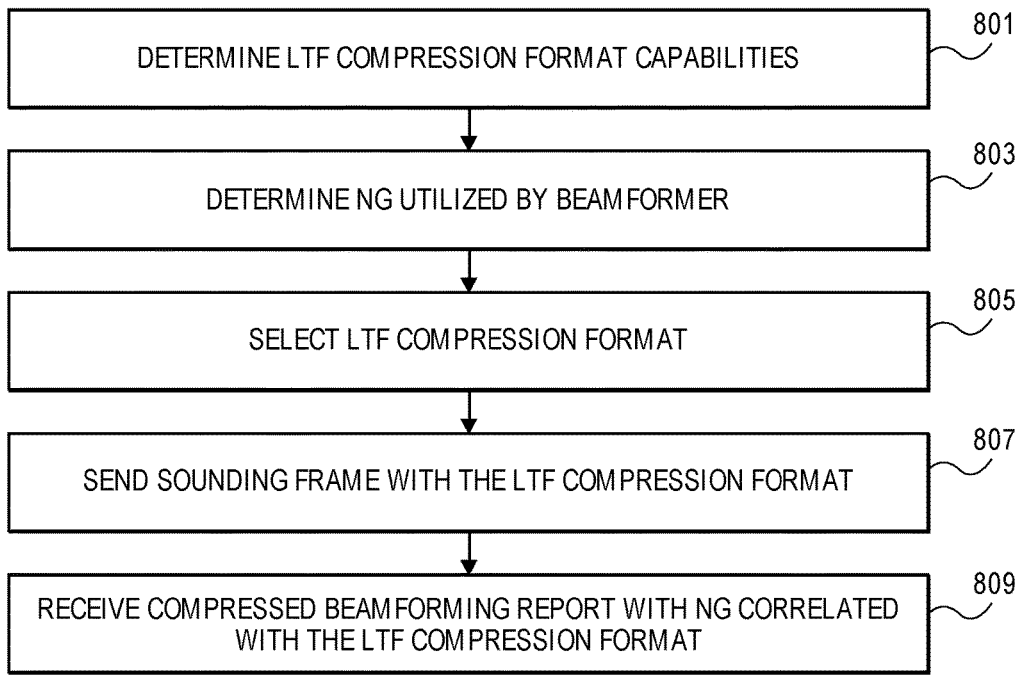
FIG. 8A is a flowchart of one embodiment of the process of the beamformer in supporting efficient beamforming reporting.

FIG. 8A is a flowchart of one embodiment of the process of the beamformer in supporting efficient beamforming reporting. During the sounding procedure, the beamformer, such as an AP or similar STA may take into consideration the format of the sounding frame to be utilize during the sounding procedure and in particular with regard to the LTF in the sounding frame (e.g., in an NDP). The LTF can be a compressed LTF and there are various types of compression as described in the examples herein above including 1x, 2x and 4× compression. The beamformer can assess at the outset of the sounding process the capabilities of the beamformer and the beamformees (Block 801). In some cases this may include determining the Ng utilized by the beamformees in reporting the compressed beamforming report (Block 803). The Ng can be discerned from prior feedback reports or similarly determined. In some cases this information may not be available.

The beamformer can select an LTF format to be utilized in the sounding frame (Block 805). In some cases, the selection is based on matching the Ng of the beamformees such that the LTF format and Ng utilized by the beamformees utilize the same sub channels or tones for channel estimation. The correspondence between the LTF format and overall NDP format can follow any of the examples set forth above. Once the LTF format is selected, then the sounding frame with the LTF can be sent to the beamformee(s) (Block 807). The beamformees process the relevant tones or sub channels and return the compressed beamforming report with only the relevant feedback for the tones and sub channels utilized by the beamformer in the sounding frame (Block 809).

Figure 8B:
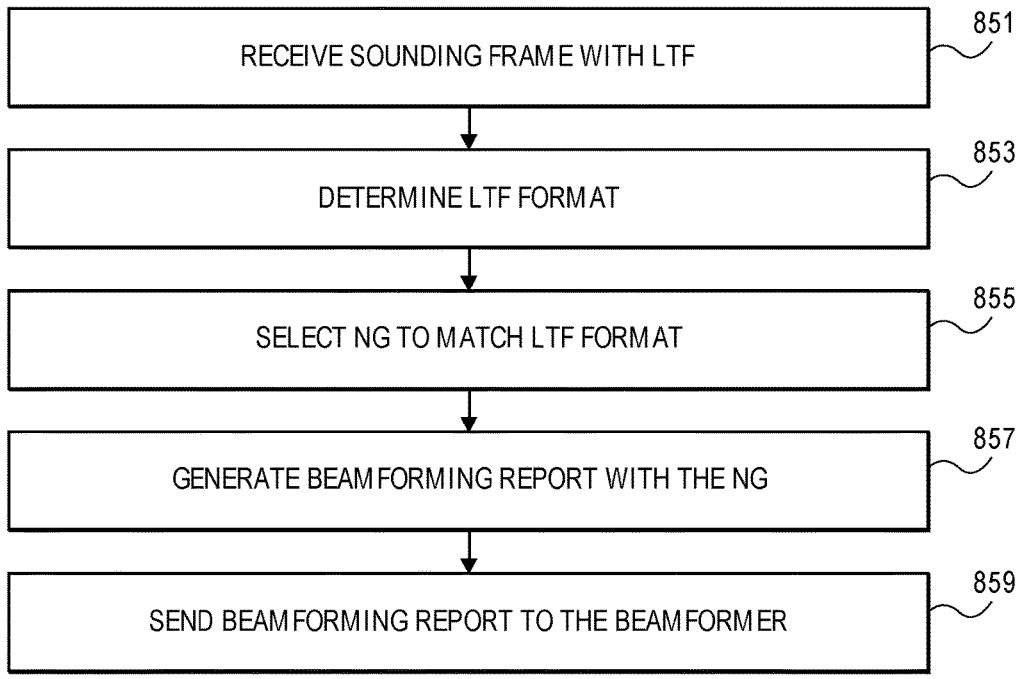
FIG. 8B is a flowchart of one embodiment of the process of the beamformee in supporting efficient beamforming reporting.

FIG. 8B is a flowchart of one embodiment of the process of the beamformee in supporting efficient beamforming reporting. During the sounding procedure, the beamformee, may take into consideration the format of the sounding frame that is received during the sounding procedure and in particular with regard to the LTF in the sounding frame (e.g., in an NDP). As mentioned above, the beamformer selects an LTF format and NDP that is sent to the beamformee. In some cases, the selection is based on matching the Ng of the beamformees such that the LTF format and Ng utilized by the beamformees utilize the same sub channels or tones for channel estimation. The correspondence between the LTF format and overall NDP format can follow any of the examples set forth above.

When the sounding frame with the LTF format is received (Block 851), then the beamformee can determine the LTF format using an identifier in the sounding frame or similar information (Block 853). The beamformee may then select an Ng that matches the LTF such that the tones or sub channels that convey information are processed while those that do not are not processed to generate the compressed beamforming report with the relevant tones or sub channel estimations and including the selected Ng (Block 857). The generated beamforming report is then returned with only the relevant feedback for the tones and sub channels utilized by the beamformer in the sounding frame (Block 859).

Figure 9:
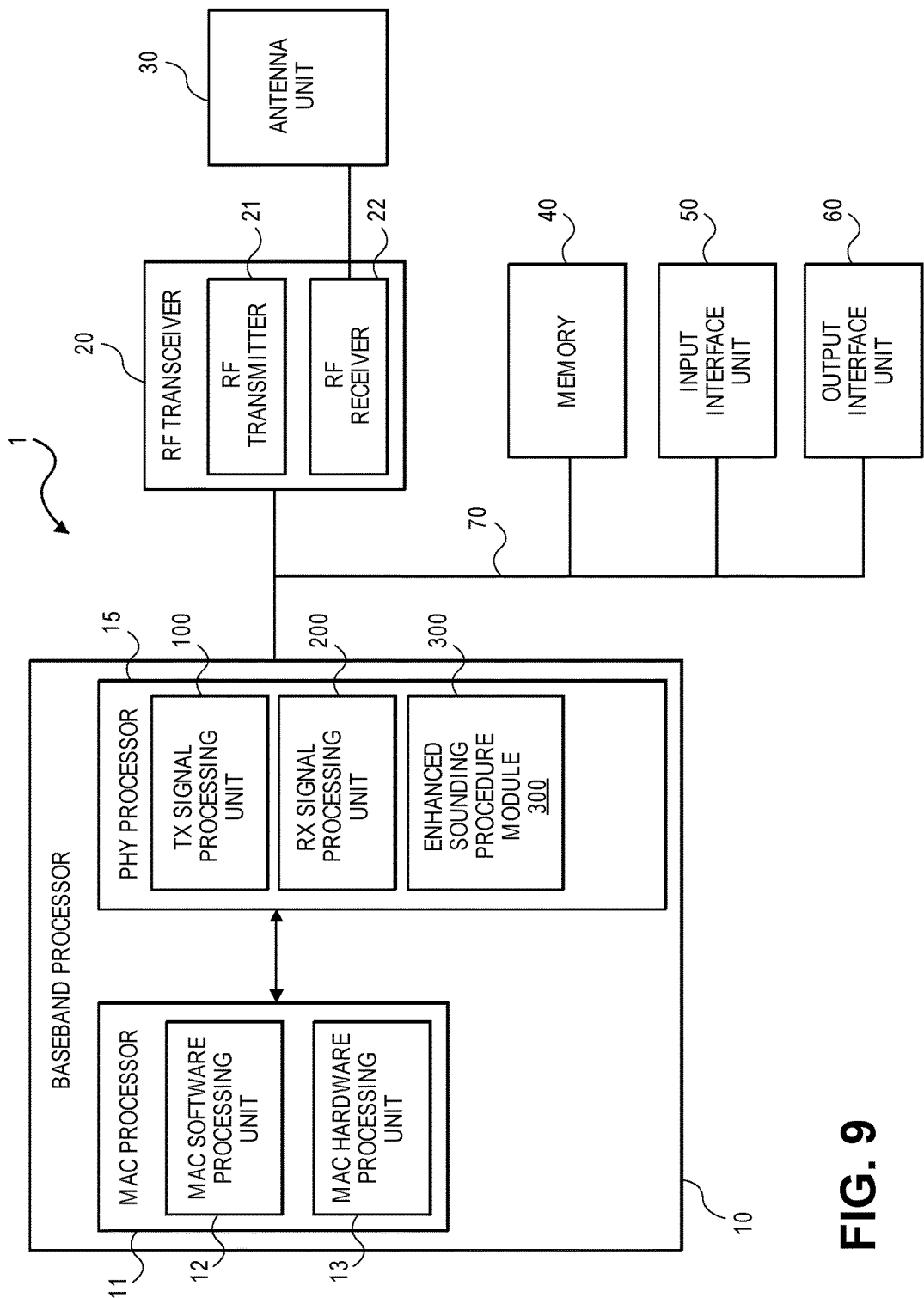
FIG. 9 is a diagram of a network device implementing a station or access point that executes an enhanced procedure module.
Figure 12:
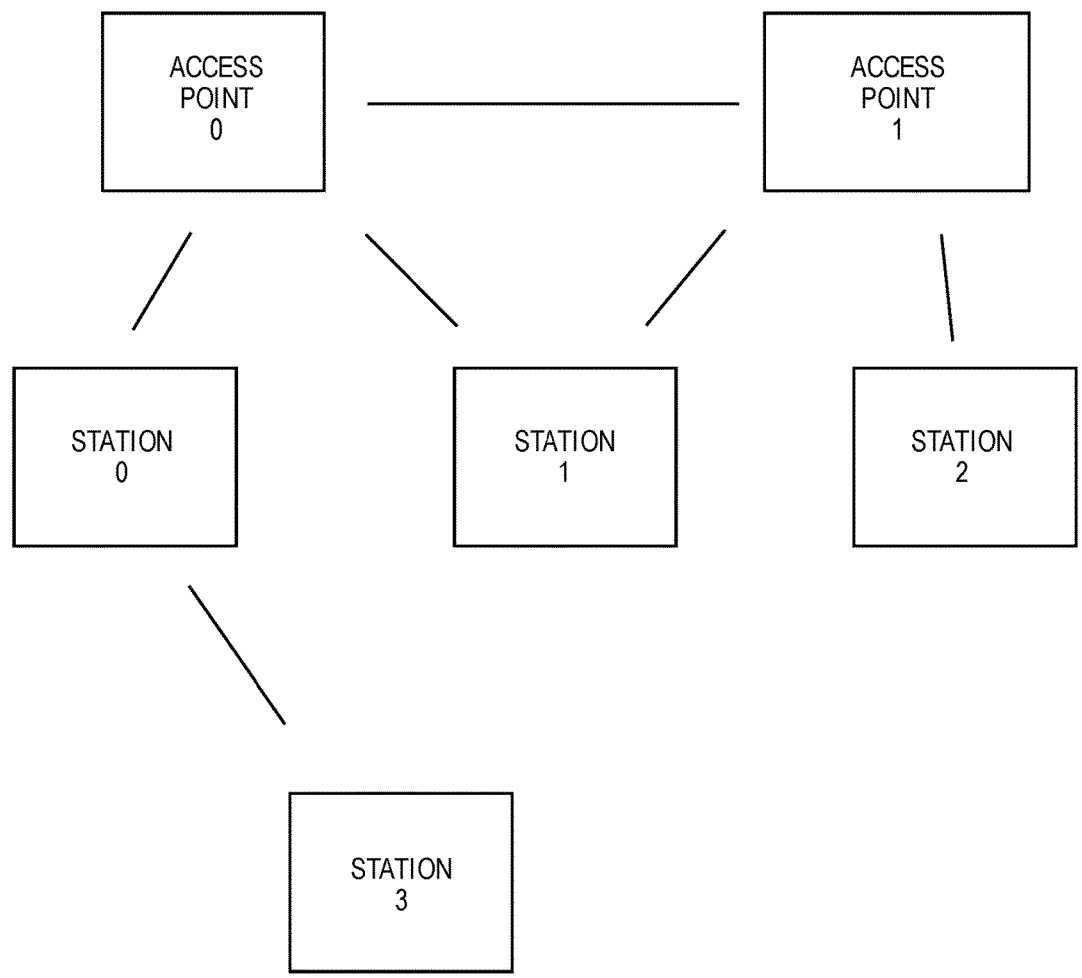
FIG. 12 is a diagram of an example wireless local area network.

FIG. 9 is a diagram of a network device implementing a station or access point that executes an enhanced sounding procedure module. In a wireless local area network (WLAN) such as the example WLAN illustrated in FIG. 12, a basic service set (BSS) includes a plurality of network devices referred to herein as WLAN devices. Each of the WLAN devices may include a medium access control (MAC) layer and a physical (PHY) layer according to IEEE 802.11 standard. In the plurality of WLAN devices, at least one WLAN device may be an access point (AP) station (e.g., access point 0 and access point 1 in FIG. 12) and the other WLAN devices may be non-AP stations (non-AP STAs), (e.g., stations 0-3 in FIG. 12). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 12, a WLAN can have any combination of stations and access points that can form discrete network, an ad hoc network or any combination thereof. Any number of APs and stations can be included in a WLAN and any topology and configuration of such APs and stations in the network can be utilized.

Referring to FIG. 9, the example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC).

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

The PHY processor 15 includes a transmitting signal processing unit 100 and a receiving signal processing unit 200 described further herein below with reference to FIGS. 11 and 12. In some embodiments, the PHY processor 15 can also implement the enhanced sounding procedure module 300. The enhanced sounding procedure module 300 can implement the respective functions for any combination of the embodiments described herein above with regard to FIGS. 1-8. In other embodiments, these modules may be implemented by or distributed over both the PHY processor 15 and the MAC processor 11. These modules may be implemented as software or as hardware components of either the PHY processor 15 or MAC processor 11. These modules can be implemented as components of the transmitting signal processing unit 100 and the receiving signal processing unit 200 or as discrete components. In a further embodiment, the enhanced sounding procedure module 300 can be implemented by separate components or processors within the baseband processor.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store the nearby stations set. The input interface unit 50 receives information from a user and the output interface unit 60 outputs information to the user.

The antenna unit 30 includes one or more antennas. When a multiple-input multiple-output (MIMO) or a multi-user MIMO (MU-MIMO) system is used, the antenna unit 30 may include a plurality of antennas.

Figure 10:
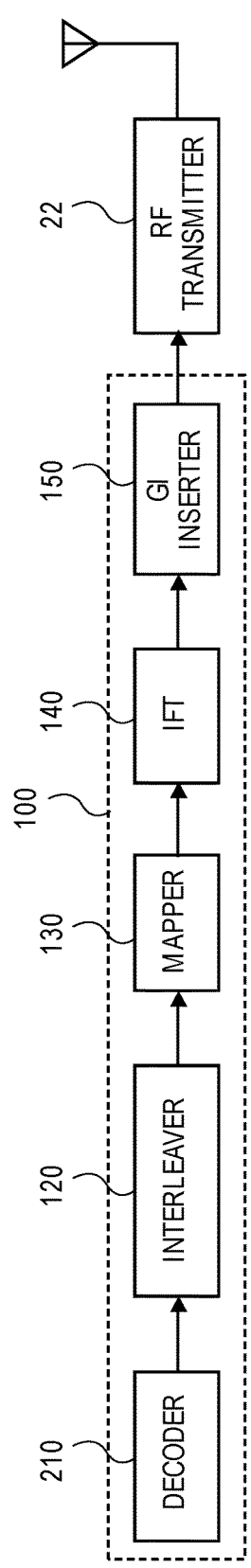
FIG. 10 is a schematic block diagram exemplifying a transmitting signal processor in a WLAN device.

FIG. 10 is a schematic block diagram exemplifying a transmitting signal processor in a WLAN device. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input-multiple output (MIMO) or multiple user (MU)-MIMO is used, the transmitting signal processing unit 100 may use a plurality of interleavers 120 and a plurality of mappers 130 corresponding to the number $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 11:
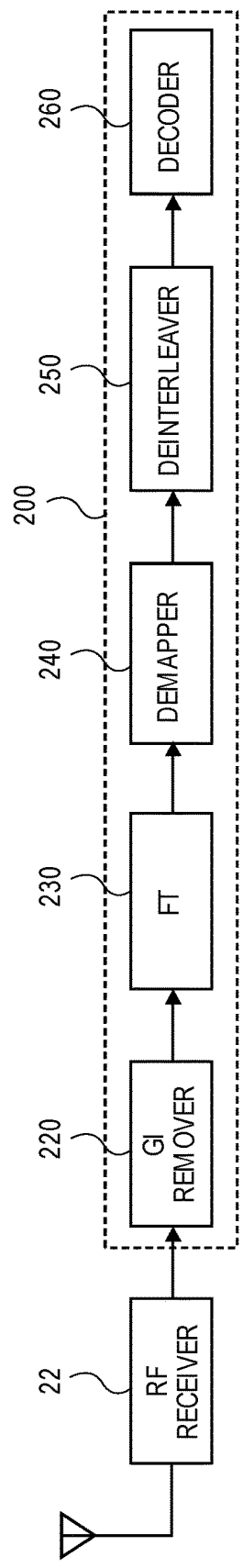
FIG. 11 is a schematic block diagram exemplifying a receiving signal processing unit in the WLAN.

FIG. 11 a schematic block diagram exemplifying a receiving signal processing unit in the WLAN. Referring to FIG. 11, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 100 may not use the encoder deparser.

A frame as used herein may refer to a data frame, a control frame, or a management frame may be exchanged between WLAN devices. The data frame is used for transmission of data forwarded to a higher layer. The WLAN device transmits the data frame when the wireless medium is considered to be in an idle condition or state such as after performing backoff if a DIFS has elapsed from a time when the medium was not busy or under similar conditions. The management frame is used for exchanging management information, which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for an associated access category (AC), i.e., AIFS[AC] has elapsed. In this case, the data frame, the management frame, or the control frame, which is not the response frame, may use the AIFS[AC].

Clear channel assessment (CCA) is implemented to manage the transmission of frames by the WLAN device. CCA may implement a CSMA (carrier sense multiple access)/CA (collision avoidance) based frame transmission procedure or similar procedure for avoiding collisions between frames in a channel.

Figure 13:
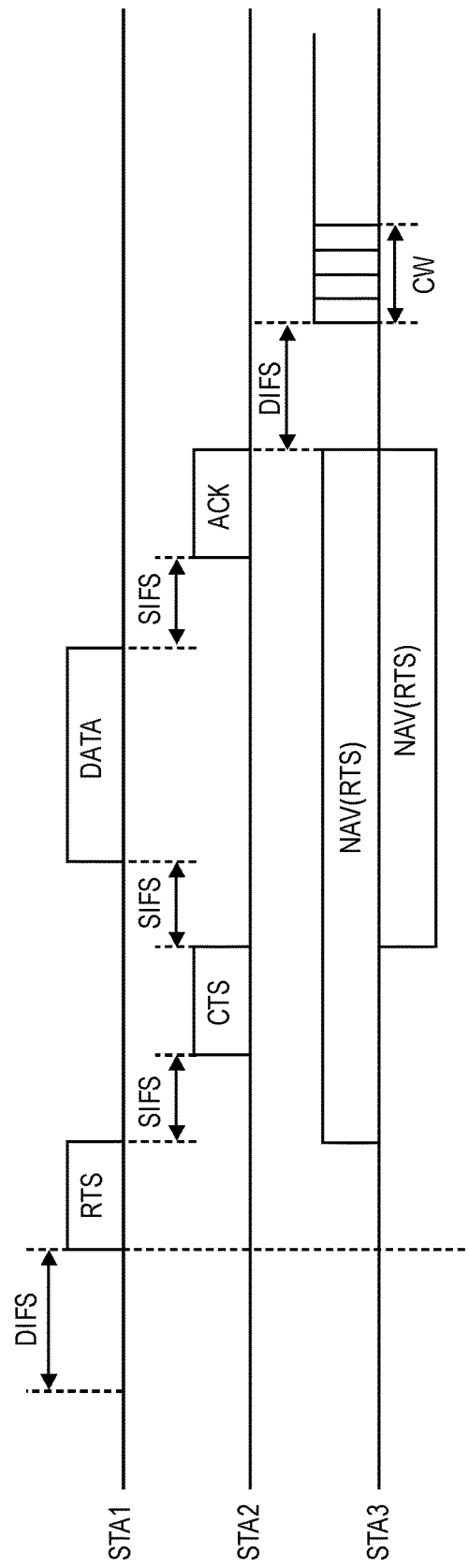
FIG. 13 is a timing diagram providing an example of the carrier sense multiple access/collision avoidance (CSMA/CA) transmission procedure.

FIG. 13 is a timing diagram providing an example of the CSMA/CA transmission procedure. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a network allocation vector (NAV) timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+ SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+ SIFS+ACK frame duration) by using duration information included in the RTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

The solutions provided herein have been described with reference to a wireless LAN system; however, it should be understood that these solutions are also applicable to other network environments, such as cellular telecommunication networks, wired networks, and similar communication networks.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

The PHY entity for IEEE 802.11 implemented in the WLAN device is based on orthogonal frequency division multiple access (OFDM or OFDMA). In either OFDM or OFDMA PHY layers, a STA is capable of transmitting and receiving PPDUs that are compliant with the mandatory PHY specifications. In a PHY specification, set of MCS and maximum number of spatial streams are defined. Also in some PHY entities, downlink and/or uplink MU transmission with a maximum number of space-time streams per user and up to a fix total number of space-time streams is defined.

Figure 14:
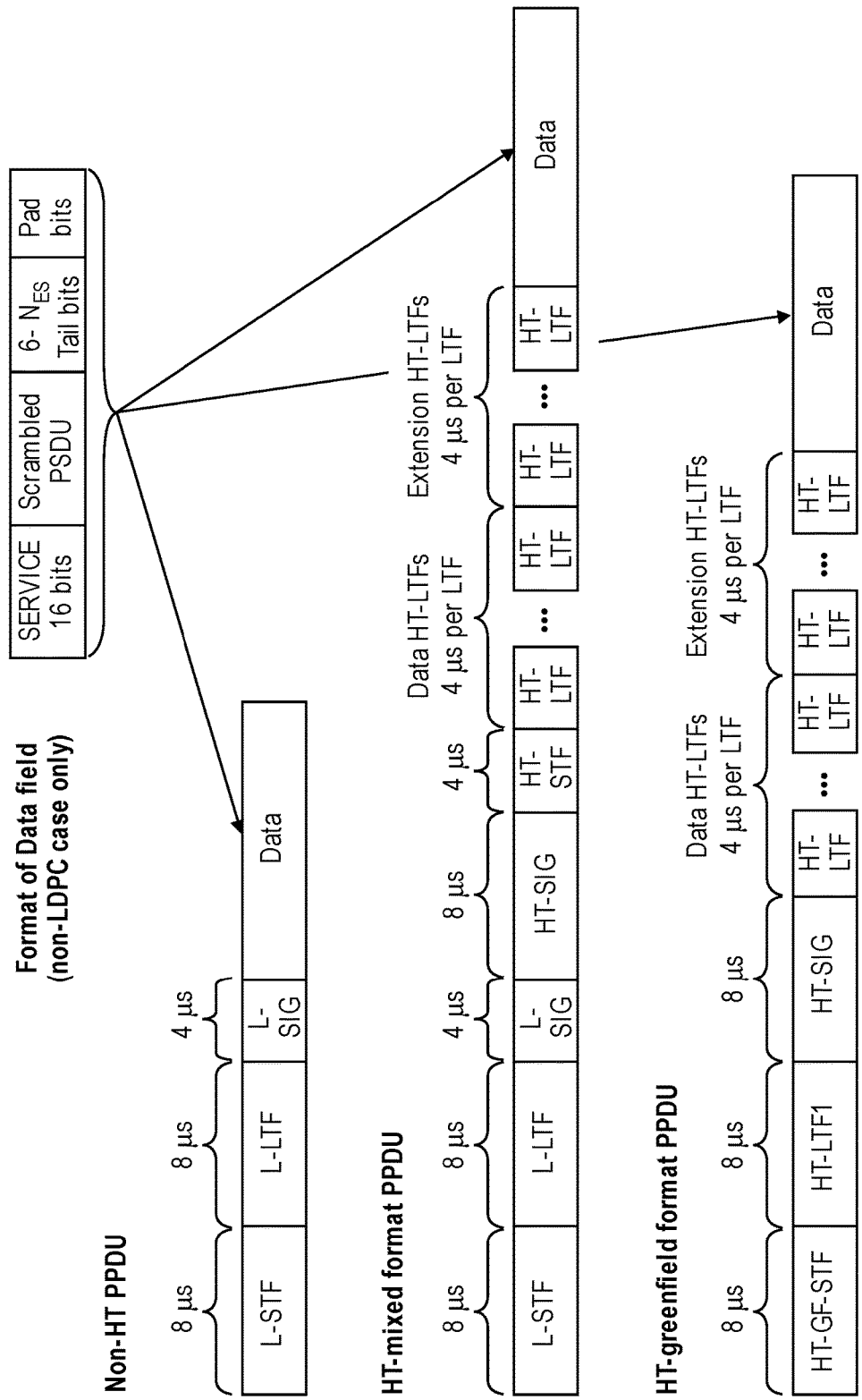
FIG. 14 is a diagram of the different IEEE 802.11n PPDU formats.

While the embodiments relate to enhancements to the sounding procedure for WLANs as may be applicable to IEEE 802.11 ax and later technologies, it is relevant to the discussion how several related and preceding technologies function. One such technology is IEEE 801.11n high throughput (HT) defined physical layer convergence protocol (PLCP) protocol data units (PDU) (PPDUs). In particular, the IEEE 802.11n PPDU have several formats. Two formats are defined for the PPDU: HT-mixed format and HT-greenfield format. These two formats are called HT formats. FIG. 14 is a diagram of the different IEEE 802.11n PPDU formats. This diagram shows the non-HT PPDU format and the HT formats. There is also a modulation coding scheme (MCS) 32 format used for MCS 32 that specifies the lowest rate in a 40 MHz channel. In addition to the HT formats, there is a non-HT duplicate format that duplicates the 20 MHz non-HT packet in two 20 MHz halves of a 40 MHz channel.

A FORMAT parameter determines the overall structure of the PPDU. For a non-HT format (NON_HT), the packets of this format are structured according to the Clause 18 (Orthogonal frequency division multiplexing (OFDM) PHY specification) (OFDM) or Clause 19 (Extended Rate PHY (ERP) specification) (ERP) specification. For an HT-mixed format (HT_MF), the packets of this format contain a preamble compatible with orthogonal frequency division multiplexing (OFDM) and extended rate PHY (ERP) receivers. For the non-HT-short training field (STF) (L-STF), the non-HT-long training field (LTF) (L-LTF), and the non-HT SIGNAL field (L-SIG), these fields are defined so they can be decoded by non-HT OFDM) PHY and ERP STAs. The rest of the packet cannot be decoded by OFDM PHY or ERP STAs. For the HT-greenfield format (HT_GF), HT packets of this format do not contain a non-HT compatible part. An HT STA that does not support the reception of an HT-greenfield format packet may be able to detect that an HT-greenfield format packet is an HT transmission (as opposed to a non-HT transmission). In this case, the receiver may decode the HT-SIG and determine whether the HT-SIG cyclic redundancy check (CRC) passes.

Another relevant technology is IEEE 802.11ac very high throughput (VHT). Clause 22 of IEEE 802.11ac specifies the PHY entity for a very high throughput (VHT) orthogonal frequency division multiplexing (OFDM) system. In addition to the requirements in Clause 22, a VHT STA may be capable of transmitting and receiving PPDUs that are compliant with the mandatory PHY specifications defined in Clause 20. The VHT PHY is based on the HT PHY defined in Clause 20, which in turn is based on the OFDM PHY defined in Clause 18. The VHT PHY extends the maximum number of space-time streams supported to eight and provides support for downlink multi-user (MU) transmissions. A downlink MU transmission supports up to four users with up to four space-time streams per user with the total number of space-time streams not exceeding eight.

A VHT single-user (SU) PPDU includes individually addressed and group addressed transmissions. The VHT PHY provides support for 20 MHz, 40 MHz, 80 MHz and 160 MHz contiguous channel widths and support for 80+80 MHz non-contiguous channel width. The VHT PHY data subcarriers are modulated using binary phase shift keying (BPSK), quadrature phase shift keying (QPSK), 16-quadrature amplitude modulation (16-QAM), 64-QAM and 256-QAM. Forward error correction (FEC) coding (convolutional or LDPC coding) is used with coding rates of 1/2, 2/3, 3/4 and 5/6.

A VHT STA may be required to support the following features non-HT and non-HT duplicate formats (transmit and receive) for all channel widths supported by the VHT STA, HT-mixed format (transmit and receive), VHT format (transmit and receive), 20 MHz, 40 MHz and 80 MHz channel widths, single spatial stream VHT-MCSs 0 to 7 (transmit and receive) in all supported channel widths, binary convolutional coding.

A VHT STA may optionally support the following features HT-greenfield format (transmit and receive), 2 or more spatial streams (transmit and receive), 400 ns short guard interval (transmit and receive), beamforming sounding (by sending a VHT NDP), responding to transmit beamforming sounding (by providing compressed beamforming feedback), STBC (transmit and receive), LDPC (transmit and receive), VHT MU PPDUs (transmit and receive), support for 160 MHz channel width, support for 80+80 MHz channel width, VHT-MCSs 8 and 9 (transmit and receive).

Figures 15, 16:
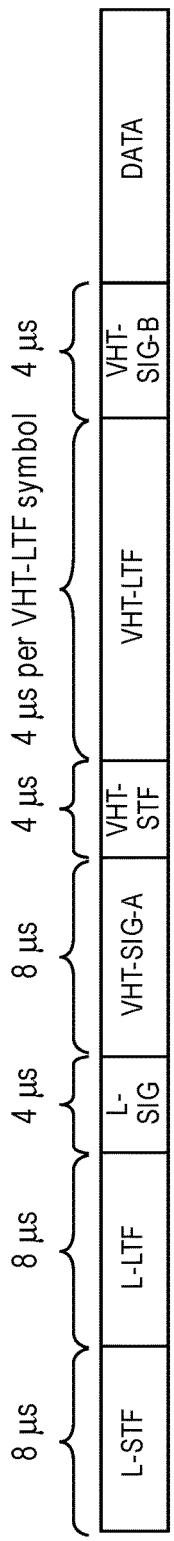
FIG. 15 is a diagram of a very high throughput (VHT) physical layer convergence protocol (PLCP) protocol data unit PPDU utilized by a WLAN device physical layer.
FIG. 16 is a table of the fields of the VHT PPDU.

FIG. 15 is a diagram of a very high throughput (VHT) PPDU utilized by the WLAN device PHY layer. FIG. 16 is a table of the fields of the VHT PPDU. Some PHY entities define PPDU that are individually addressed (where identification is based on AID or Partial AID) and some are group addressed (where identification is based on Group ID, GID). Some PHY entities provide support for 20 MHz, 40 MHz, 80 MHz and 160 MHz contiguous channel widths and support for 80+80 MHz non-contiguous channel width. The data subcarriers are modulated using binary phase shift keying (BPSK), quadrature phase shift keying (QPSK), 16-quadrature amplitude modulation (16-QAM), 64-QAM and 256-QAM. Forward error correction (FEC) coding (convolutional or LDPC coding) is used with coding rates of 1/2, 2/3, 3/4 and 5/6.

In each PHY entity, there would be fields denoted as L-SIG, SGI-A, SIG-B where some crucial information about the PSDU attributes are listed. These symbols are usually encoded with the most robust MCS. The L-SIG, SGI-A, SIG-B have very limited number of bits and it is desired to encode them in the most compact form possible. In a receiving STA, first these symbols are decoded in order to obtain vital information about the PSDU attributes and some MAC attributes. In IEEE 802.11ac, these symbols are called VHT SIG-A and VHT SIG-B symbols.

As discussed above, WLAN devices are currently being deployed in diverse environments. These environments are characterized by the existence of many access points and non-AP stations in geographically limited areas. Increased interference from neighboring devices gives rise to performance degradation. Additionally WLAN devices are increasingly required to support a variety of applications such as video, cloud access, and offloading. In particular video traffic is expected to be the dominant type of traffic in many high efficiency WLAN deployments. With the real-time requirements of some of these applications, WLAN users demand improved performance in delivering their applications, including improved power consumption for battery-operated devices.

IEEE 802.11ax or HE SIG-A and IEEE 802.11ax or HE SIG-B are referred to simply as simply by SIG-A and SIG-B and are amendments to the IEEE 802.11 standard directed at addressing these problems. Unlike previous amendments where the focus was on improving aggregate throughput, this amendment focuses on improving metrics that reflect user experience, such as average per station throughput, the 5th percentile of per station throughput of a group of stations, and area throughput. Improvements will be made to support environments such as wireless corporate office, outdoor hotspot, dense residential apartments, and stadiums.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

Note the operations of the flowcharts are described with reference to the exemplary embodiments of the diagrams. However, it should be understood that the operations of flowcharts can be performed by embodiments of the invention other than those discussed, and the embodiments of the diagrams can perform operations different than those discussed with reference to the flowcharts.

While the flowcharts in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A non-transitory computer-readable medium having stored therein computer code, which when executed by a networking device functioning as a beamformer in a wireless local area network (WLAN), cause the networking device to perform a set of operations to improve a sounding procedure where a steering matrix or a compressed beamforming report is utilized by the beamformer using feedback from at least one beamformee, the steering matrix or compressed beamforming report to determine a spatial path for transmission from the beamformer to a set of beamformees in the WLAN, the set of operations comprising:
selecting, by the beamformer, a bandwidth for a sounding frame used to perform the sounding procedure;
generating, by the beamformer, the sounding frame at the selected bandwidth using a mode of operation from a plurality of modes of operation, wherein each mode of operation corresponds to a frame format and the mode of operation used to generate the sounding frame has a minimum pilot tone density amongst frame formats of the plurality of modes of operation with the selected bandwidth; and
transmitting the sounding frame to the set of beamformees.

2. The transitory computer-readable medium of claim 1, wherein the plurality of modes of operation includes a single user mode of operation at the selected bandwidth and a multiuser mode of operation at the selected bandwidth for transmissions using a High-Efficiency Physical Layer Convergence Protocol (PLCP) Protocol Data Unit (PPDU).

3. The non-transitory computer-readable medium of claim 1, wherein the plurality of modes of operation includes a first mode of operation at the selected bandwidth with a first resource unit allocation and a second mode of operation at the selected bandwidth with a second resource unit allocation.

4. The non-transitory computer-readable medium of claim 3, wherein the first resource unit allocation includes multiple resource units and the second resource unit allocation includes a single resource unit,
wherein the mode of operation used to generate the sounding frame is the second mode of operation.

5. The non-transitory computer-readable medium of claim 4, wherein the multiple resource units are each portions of the selected bandwidth and the single resource unit is the entire selected bandwidth.

6. The non-transitory computer-readable-medium of claim 4, having further instructions stored therein to cause the networking device to perform additional operations comprising:
transmitting, by the beamformer, a data frame to two or more of the beamformees using the first mode of operation.

7. The non-transitory computer-readable medium of claim 1, wherein the plurality of modes of operation are modes which the beamformer is permitted to transmit within the WLAN.

8. The non-transitory computer-readable medium of claim 1, wherein the sounding frame is a null data packet (NDP) frame.

9. A method implemented by a beamformer in a wireless local area network (WLAN), the method to improve a sounding procedure where a steering matrix or a compressed beamforming report is utilized by the beamformer using feedback from at least one beamformee, the steering matrix or compressed beamforming report to determine a spatial path for transmission from the beamformer to a set of beamformees in the WLAN, the method comprising:
selecting, by the beamformer, a bandwidth for a sounding frame used to perform the sounding procedure;
generating, by the beamformer, the sounding frame at the selected bandwidth using a first mode of operation corresponding to a first frame format, wherein the first mode of operation is within a set of modes of operation that the beamformer is permitted to utilize in the WLAN, wherein each mode of operation in the set of modes of operation corresponds to a separate frame format and the first frame format has a minimum pilot tone density amongst the frame formats associated with the modes of operation in the set of modes of operation with the selected bandwidth; and
transmitting the sounding frame to the set of beamformees.

10. The method of claim 9, wherein the set of modes of operation includes a single user mode of operation at the selected bandwidth and a multiuser mode of operation at the selected bandwidth for transmissions using a High-Efficiency Physical Layer Convergence Protocol (PLCP) Protocol Data Unit (PPDU).

11. The method of claim 9, wherein the set of modes of operation includes the first mode of operation at the selected bandwidth with a first resource unit allocation and a second mode of operation at the selected bandwidth with a second resource unit allocation.

12. The method of claim 11, wherein the first resource unit allocation includes a single resource unit and the second resource unit allocation includes multiple resource units.

13. The method of claim 12, wherein the multiple resource units are each portions of the selected bandwidth and the single resource unit is the entire selected bandwidth.

14. The method of claim 12, further comprising:
transmitting, by the beamformer, a data frame to two or more of the beamformees using the second mode of operation.

15. The method of claim 9, wherein the sounding frame is a null data packet (NDP) frame.

16. An apparatus functioning as a beamformer in a wireless local area network (WLAN), the apparatus to improve a sounding procedure where a steering matrix or a compressed beamforming report is utilized by the beamformer using feedback from at least one beamformee, the steering matrix or compressed beamforming report to determine a spatial path for transmission from the beamformer to a set of beamformees in the WLAN, the apparatus comprising:
a Radio Frequency (RF) transceiver;
a non-transitory machine-readable medium having stored therein an enhanced sounding procedure module; and
a set of one or more processors coupled to the non-transitory machine-readable medium, the set of one or more processors configured to execute the enhanced sounding procedure module, the enhanced sounding procedure module to select a bandwidth for a sounding frame used to perform the sounding procedure, to generate the sounding frame using a first mode of operation corresponding to a first frame format, wherein the first mode of operation is within a set of modes of operation that the beamformer is permitted to utilize in the WLAN, wherein each mode of operation in the set of modes of operation corresponds to a separate frame format and the first frame format has a minimum pilot tone density amongst the frame formats associated with the modes of operation in the set of modes of operation with the selected bandwidth, and to transmit the sounding frame to the set of beamformees.

17. The apparatus of claim 16, wherein the set of modes of operation includes a single user mode of operation at the selected bandwidth and a multiuser mode of operation at the selected bandwidth for transmissions using a High-Efficiency Physical Layer Convergence Protocol (PLCP) Protocol Data Unit (PPDU).

* * * * *